(12) United States Patent
Suzuki et al.

(10) Patent No.: US 7,812,706 B2
(45) Date of Patent: Oct. 12, 2010

(54) TAG, AND METHOD AND SYSTEM USING THE SAME

(75) Inventors: Yoshihiro Suzuki, Chiba (JP); Shigetaka Noguchi, Chiba (JP); Ken Satoh, Kanagawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 1388 days.

(21) Appl. No.: 10/554,232

(22) PCT Filed: Apr. 23, 2004

(86) PCT No.: PCT/JP2004/005876

§ 371 (c)(1), (2), (4) Date: Oct. 24, 2005

(87) PCT Pub. No.: WO2004/097728

PCT Pub. Date: Nov. 11, 2004

(65) Prior Publication Data

US 2006/0220789 A1    Oct. 5, 2006

(30) Foreign Application Priority Data

Apr. 25, 2003    (JP) .............................. 2003-120871

(51) Int. Cl.
    *H04Q 5/22* (2006.01)
(52) U.S. Cl. .................. 340/10.1; 340/10.2; 340/10.51; 340/572.3; 340/572.1; 340/825.71; 343/776; 235/383
(58) Field of Classification Search ... 340/572.1–572.8, 340/10.1, 10.2, 10.51; 343/776; 235/383, 235/435

See application file for complete search history.

(56) References Cited

U.S. PATENT DOCUMENTS 5,340,968 A * 8/1994 Watanabe et al. ........... 235/380
5,884,425 A * 3/1999 Baldwin ...................... 40/638

(Continued)

FOREIGN PATENT DOCUMENTS

DE    19530608 A1    2/1997

(Continued)

OTHER PUBLICATIONS

Patent Abstracts of Japan—JP 11 078323 (Mar. 23, 1999).

*Primary Examiner*—Daniel Wu
*Assistant Examiner*—Son M Tang
(74) *Attorney, Agent, or Firm*—Birch, Stewart, Kolasch & Birch, LLP

(57) ABSTRACT

A tag (1) can be split into a tag (A(1-*a*)), a tag (B(1-*b*)), and a tag (C(1-*c*)). In the tag (A), a memory portion (A31) is included. In the tag (B), a memory portion (B32) is included. In the tag (C), a memory portion (C33), an input/output interface portion (34), and a control portion (35) are provided. The input/output interface portion (34) forms an interface for exchanging data with an external reader/writer device (not shown). The control portion (35) receives a request inputted thereto from the input/output interface portion (34) and controls the function of the tag. A split line 36 is provided between the tags (A) and (B) to allow detachment between the two tags therealong. A split line 37 is provided between the tags (B) and (C) to allow detachment between the two tags therealong. The arrangement makes it difficult to falsify data in the tag and enables an easier operation.

22 Claims, 23 Drawing Sheets

U.S. PATENT DOCUMENTS

| | | |
|---|---|---|
| 5,900,610 A | 5/1999 | Kelly, Jr. |
| 6,050,622 A * | 4/2000 | Gustafson ............... 292/307 R |
| 6,193,279 B1 | 2/2001 | Seidl |
| 6,196,447 B1 | 3/2001 | Purcell et al. |
| 6,532,158 B1 | 3/2003 | Buttet |
| 6,888,509 B2 * | 5/2005 | Atherton .................... 343/718 |
| 6,995,674 B2 * | 2/2006 | Turner et al. ............. 340/572.8 |
| 7,034,689 B2 * | 4/2006 | Teplitxky et al. ......... 340/572.7 |
| 7,102,522 B2 * | 9/2006 | Kuhns .................... 340/572.7 |
| 7,225,993 B2 * | 6/2007 | Warther ...................... 235/492 |
| 7,477,151 B2 * | 1/2009 | Forster et al. ............ 340/572.3 |
| 2004/0236899 A1 * | 11/2004 | Teicher ....................... 711/103 |
| 2004/0263319 A1 * | 12/2004 | Huomo ..................... 340/10.2 |
| 2007/0096914 A1 * | 5/2007 | Baba et al. .............. 340/572.3 |
| 2007/0152829 A1 * | 7/2007 | Lindsay et al. ........... 340/572.3 |

FOREIGN PATENT DOCUMENTS

| | | |
|---|---|---|
| DE | 19813841 A1 | 9/1999 |
| DE | 198 34 515 C1 | 3/2000 |
| EP | 0 899 683 A2 | 3/1999 |
| JP | 62-108099 A | 5/1987 |
| JP | 9-62934 A | 3/1997 |
| JP | 11-144012 A | 5/1999 |
| JP | 2000-190677 A | 7/2000 |
| JP | 2001-38302 A | 2/2001 |
| JP | 2001-315920 A | 11/2001 |
| JP | 2002-230499 A | 8/2002 |

* cited by examiner

Enlarged View of Perforation

Enlarged View of Connecting Portion of Perforation

Enlarged View of Gap Portion of Perforation

Enlarged View of Connecting
Portion of Perforation

Enlarged View of Gap
Portion of Perforation

Enlarged View of Perforation

TAG, AND METHOD AND SYSTEM USING THE SAME

TECHNICAL FIELD

The present invention relates to a tag and to a management method and system using the same.

BACKGROUND ART

In the present specification, a tag indicates an object having a radio signal transmitting/receiving device (e.g., an antenna or a light receiving/emitting element), a memory portion, and a communication portion incorporated therein and is used as a shipping label or the like. The present application is an application for claim of priority based on Japanese Patent Application No. 2003-120871, filed Apr. 25, 2003, the entire content of which is incorporated herein by reference.

In recent years, in order to prevent the theft of merchandise sold in a shop or the like, a system for preventing theft or the like has become prevalent. The system attaches a tag to merchandise, places an electric-wave transmission/reception gate for sensing the tag in the vicinity of the entrance/exit of the shop, senses the tag attached to the merchandise when it passes through the gate, and generates a beep tone. In such a system using a tag, it is possible to read data in a memory portion provided in the tag from an external terminal or write data therein. The system and the tag are used widely not only for anti-theft measures but also for product assortment in a factory, product delivery, inventory management, and the like through the reading and writing of merchandise data.

The tag mentioned above is mostly of the type which performs the reading/writing of data by using a radio signal and has a configuration as shown in, e.g., FIG. 15. As shown in FIG. 15, a radio tag 151 is a module comprised of an IC 152 for radio communication in a small size of several millimeters square or less and a coil antenna 153. The radio tag 151 is capable of performing non-contact data exchange by using a dedicated reader/writer device 154 (see, e.g., JP-A No. 62934/1997).

DISCLOSURE OF THE INVENTION

However, since a tag having data reading/writing functions disclosed in the publication mentioned above allows relatively easy reading of data and relatively easy inputting/updating/correction of written data, it has the problem of relatively easy data falsification.

Although there is a tag which performs security control by encrypting data, it has the problem of a complicated operation. If a system capable of collectively managing the process of merchandise distribution and a situation of service provision can be constructed, it will be convenient.

It is therefore an object of the present invention to provide a tag with which data falsification is difficult and an operation is easy. Another object of the present invention is to provide a system for providing merchandize or service using the tag.

A tag (including an IC card or the like) according to the present invention comprises at least one detachable portion A, has a first function while said portion A remains attached, and shifts to a second function different from said first function when said portion A is detached. More specifically, a tag composed of detachable portions A, B, and C is affixed to merchandise such that the rewriting of basic data on the product and the addition of data is enabled through the tag only during the period during which each of the three portions A, B, and C is present. The portion A is detached upon shipment from a maker. By detaching the portion A, the tag is brought into a state where the rewriting of basic data on the product and the addition of data cannot be performed.

Next, in selling the product to a consumer in a shop, additional data such as a sales date is inputted to the tag and then the portion B is detached from the tag and passed to the consumer. It is to be noted that the additional data such as the sales date cannot be inputted to the tag in a state where the portion A is attached thereto. The tag composed only of the portion C after the detachment of the portions A and B allows the inputting and checking of data only with regard to a specified content allocated to a user. In a state in which the portion A or B is attached to the tag, the inputting of the additional data allocated to the user and reference thereto cannot be performed.

By thus providing the tag with the physically detachable portions and changing the function thereof through detachment, a tag with which later data falsification is extremely difficult can be provided. Preferably, the separable portions of the tag and a portion thereof other than the separable portions have characteristic configurations. For example, the case where at least one surface thereof forms a circular, ellipsoidal, polygonal, or generally polygonal configuration corresponds thereto. Alternatively, the individual separable portions of the tag and the portion thereof other than the separable portions preferably have visually different characteristic features. For example, the case where patterns on outer surfaces, the colors thereof, or the combinations thereof are entirely or partly different corresponds thereto.

The present invention is also applicable to a method for managing a slip for service using a tag. For example, the present invention can be applied to a method for managing a slip for service, the method including the steps of: affixing or attaching the tag to a slip related to service at a stage of receiving an order of the service or writing first data related to the service to be provided in the slip with the tag attached thereto; detaching, at a stage of providing the service, a part of the tag at the stage of receiving the order of the service and writing second data related to a step of providing the service in a remaining portion of the tag after the detachment; and further detaching, at the stage of providing the service, a part of the tag in a final condition at the stage of providing the service and writing third data related to a situation of service provision in a remaining portion of the tag after the detachment.

BEST MODE FOR CARRYING OUT THE INVENTION

A tag according to the present invention is a functional tag of which the function can be changed through detachment. A description will be given to a tag according to an embodiment of the present invention with reference to the drawings.

Figure 1:
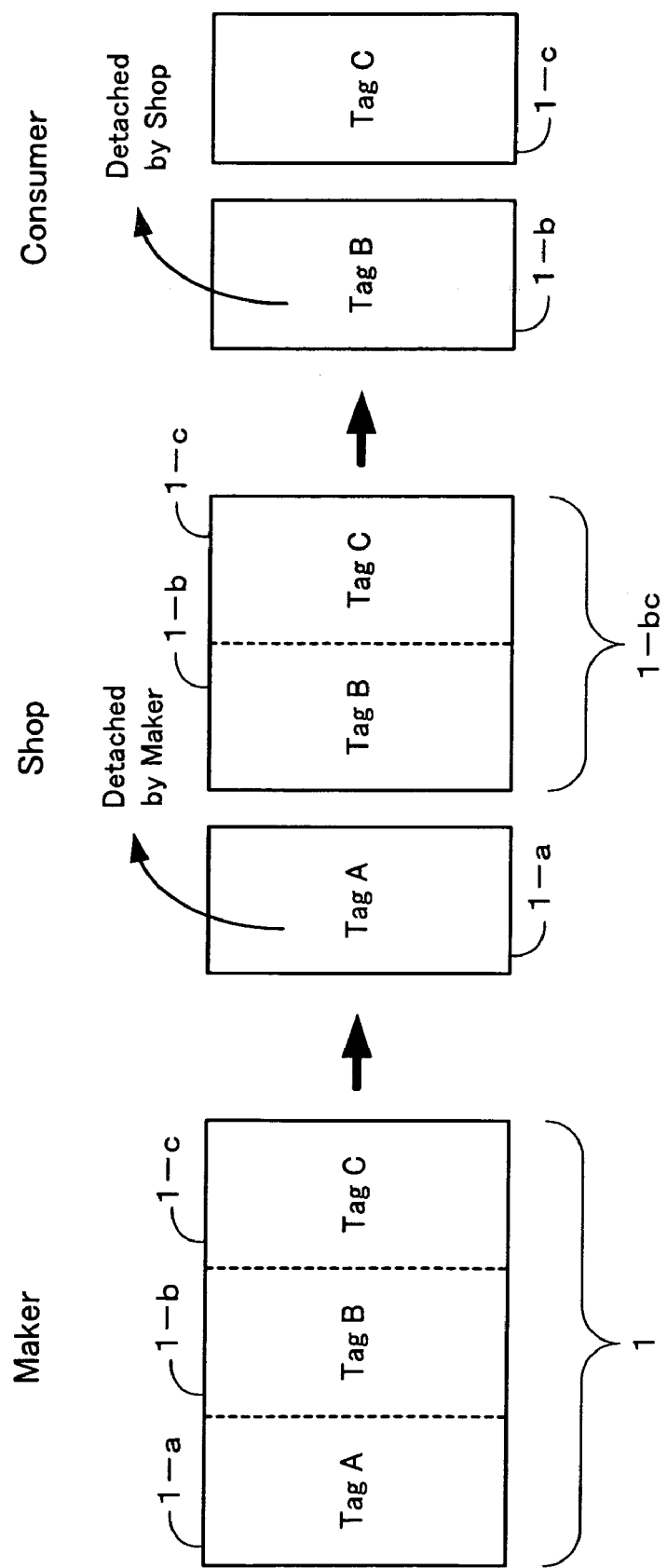
FIG. 1 shows an example of the configuration of a tag comprising detachable portions according to an embodiment of the present invention.

FIG. 1 is a view schematically showing the configuration of the tag according to the embodiment of the present invention. As shown in FIG. 1, the tag 1 according to the present embodiment is composed of the three portions of, e.g., a tag A(1-*a*), a tag B (1-*b*), and a tag C (1-*c*). The tag A (1-*a*) and the tag B (1-*b*) are detachable from each other.

A description will be given herein below to the changing of the state of the tag 1 in the process of merchandise distribution. A maker detaches the tag A (1-*a*) from the tag 1 in a state where each of the tags A to C is present and ships merchandise. The merchandise in a state (1-*bc*) where the tags B and C are present is shipped into a shop. In the shop, the tag B (1-*b*) is detached so that only the tag C (1-*c*) remains when the tag 1 passes into the hands of a consumer.

Figure 2:
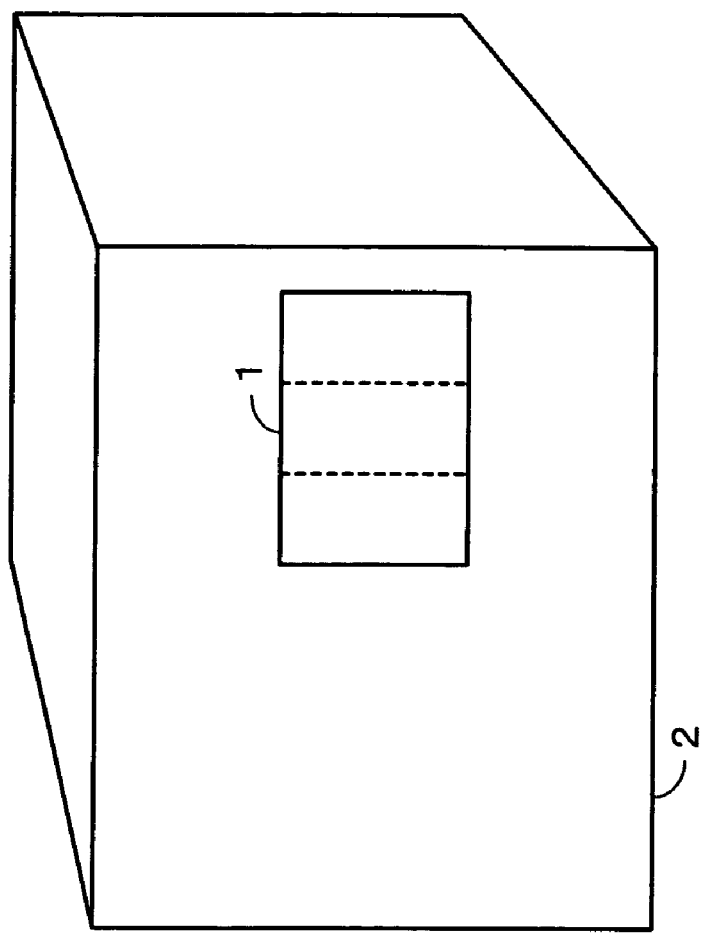
FIG. 2 shows an example of the affixing of the tag according to the embodiment of the present invention to merchandise.

FIG. 2 shows an exemplary mode in which the tag 1 comprising the detachable portions is affixed to merchandise in the present embodiment. In the example of FIG. 2, the tag 1 is affixed to the surface of a package 2 for merchandise. The position to which the tag 1 is affixed may be any provided that data can be read and written from the outside by using a reader/writer device and the tags A and B can be detached.

Figure 3:
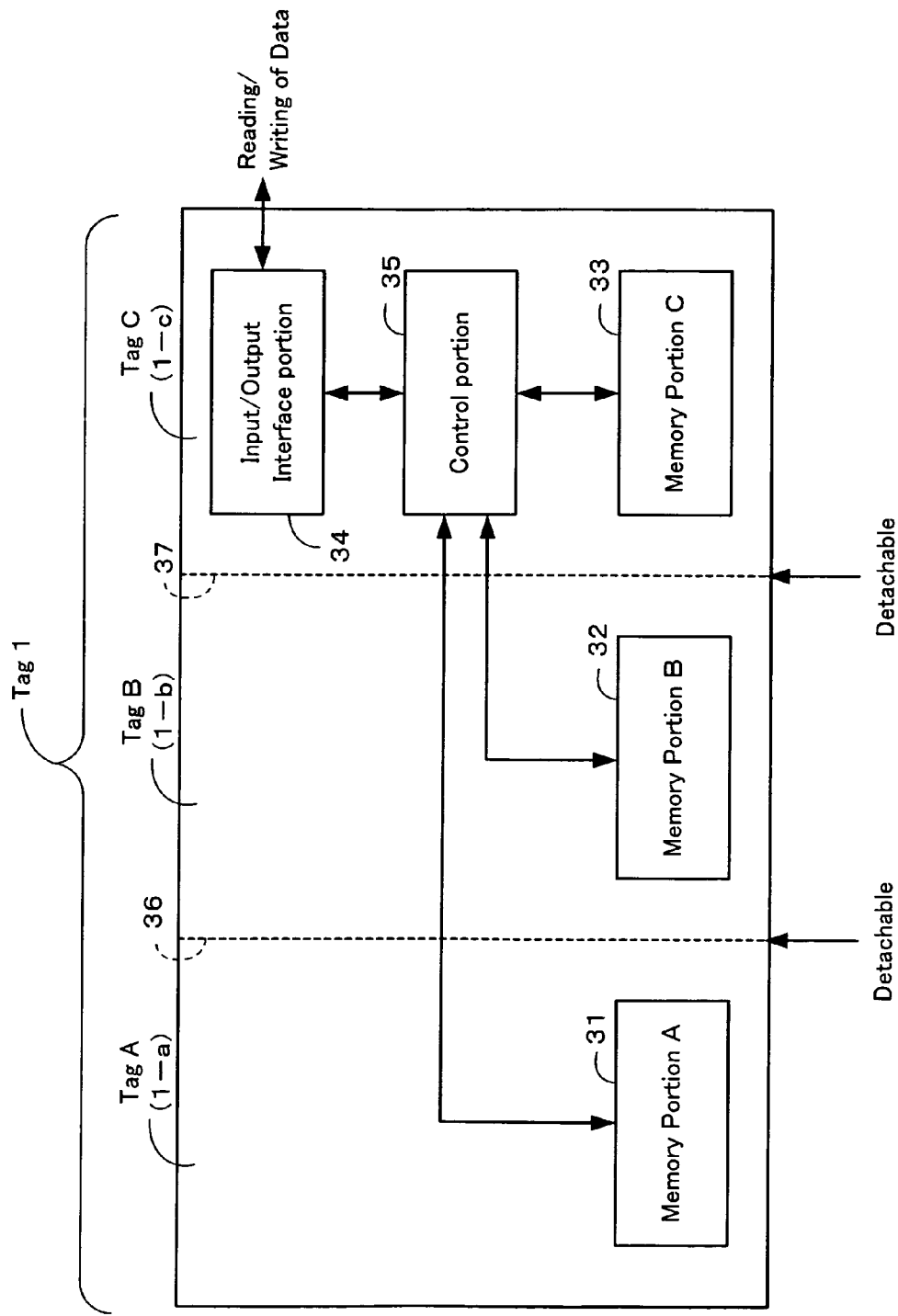
FIG. 3 is a block diagram showing an example of the inner configuration of the tag according to the embodiment of the present invention.

FIG. 3 shows an example of the internal structure of the tag 1 according to the present embodiment. As described above, the tag can be separated into the tag A(1-*a*), the tag B(1-*b*), and the tag C(1-*c*). In the tag A, a memory portion A31 is included. In the tag B, a memory portion B32 is included. In the tag C, a memory portion C33, an input/output interface portion 34, and a control portion 35 are provided. The input/output interface portion 34 forms an interface for performing data exchange with an external reader/writer device (not shown). The control portion 35 receives a request inputted thereto from the input/output interface portion 34 and controls the function of the tag. A split line 36 is provided between the tags A and B to allow detachment between the two tags therealong. A split line 37 is provided between the tags B and C to allow detachment between the two tags therealong.

Figure 7:
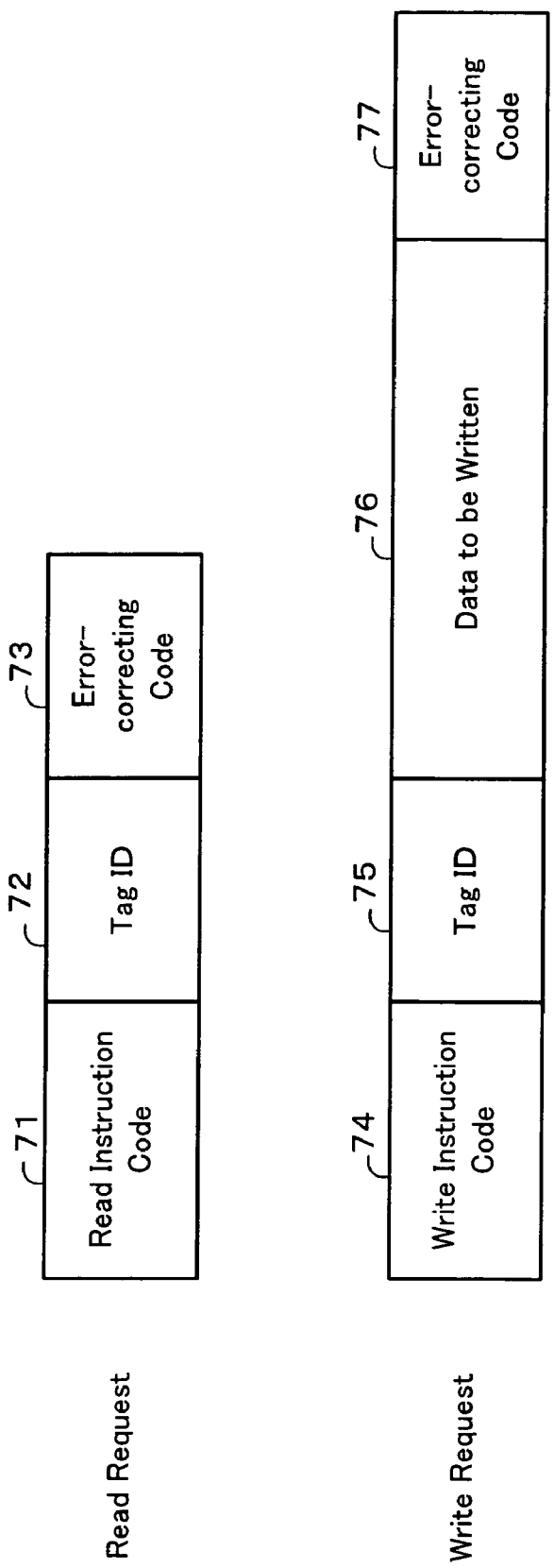
FIG. 7 shows a format of data inputted/outputted to and from an external reader/writer device.

FIG. 7 shows an example of the configuration of data exchanged between the tag according to the present embodiment and an external reader/writer device. As shown in FIG. 7, two types of data, which are read request data and write request data, are present in the data. The read request data has a read instruction code 71 indicative of a read request, a tag ID 72, and an error-correcting code 73 for correcting an error in the data. The write request data has an instruction code 74 indicative of a write request, a tag ID 75, data 76 to be written, and an error-correcting code 77.

Figure 14:
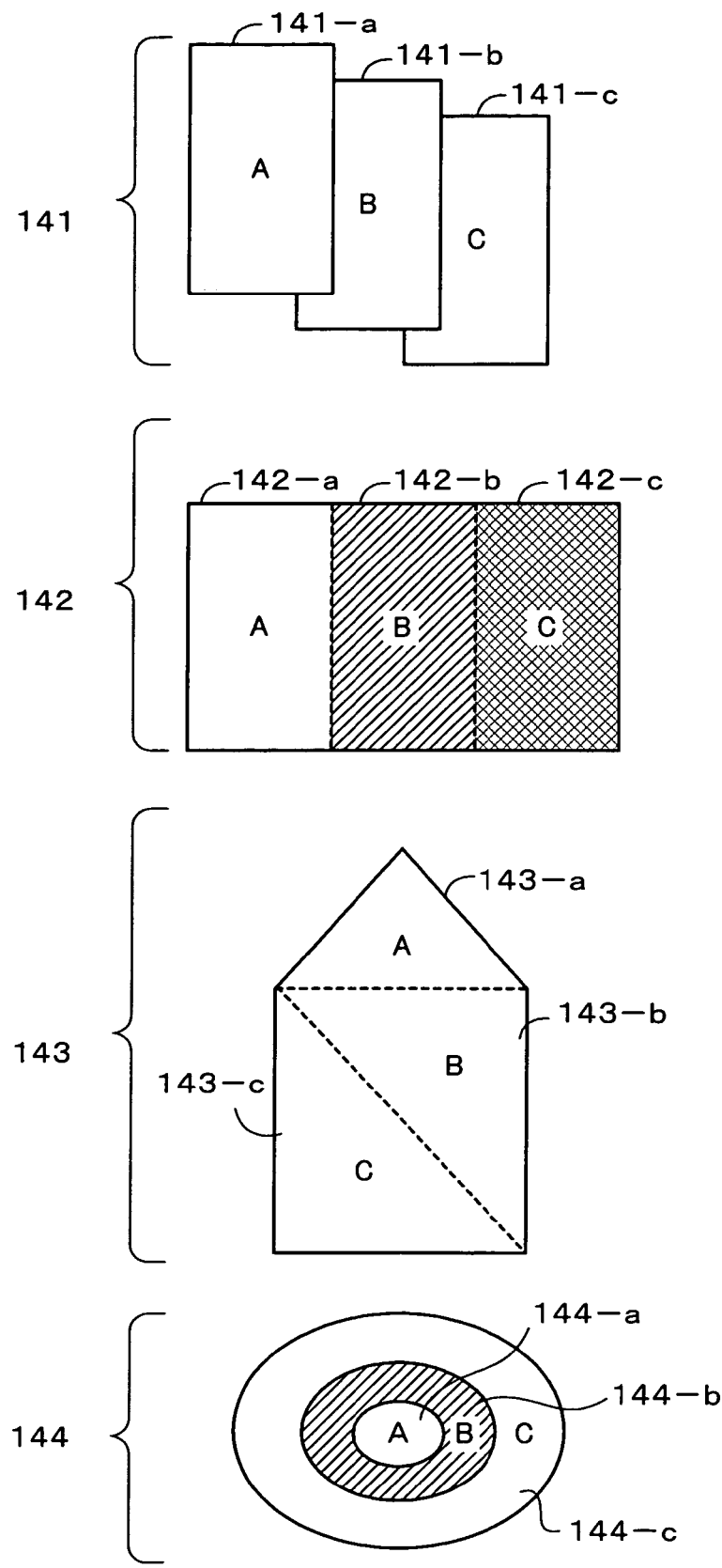
FIG. 14 shows a variation of the tag including the detachable portions according to the embodiment of the present invention.
Figure 15:
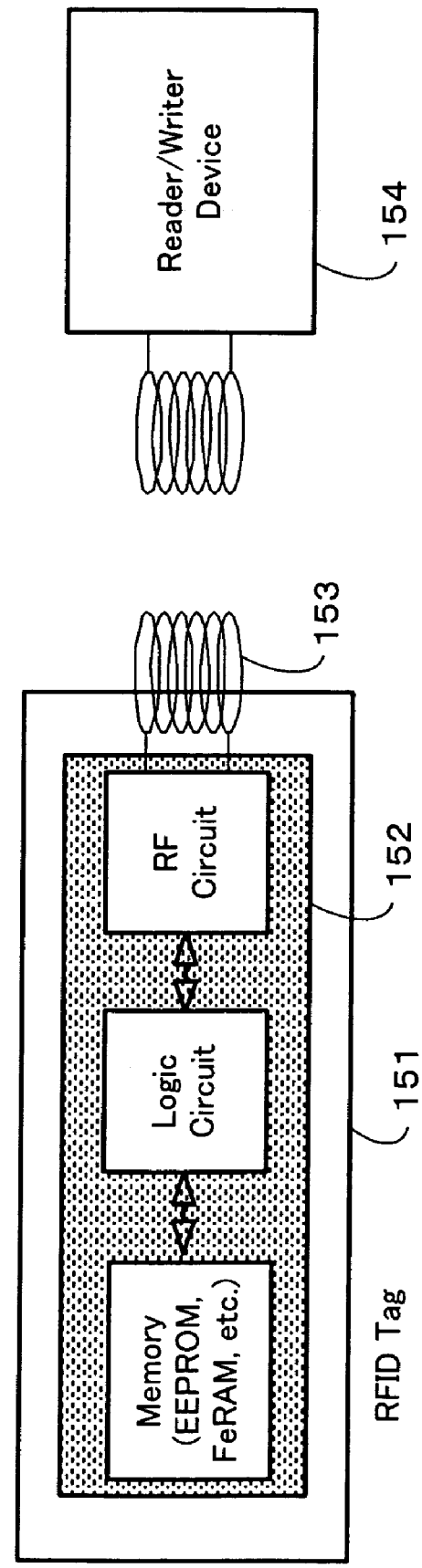
FIG. 15 shows the structure of a typical radio tag.

FIG. 14 shows a variation of the tag comprising the detachable portions. The configuration of the tag and a method for detachment may be any provided that the tag comprises the detachable portions. A tag 141 has portions 141-*a*, 141-*b*, and 141-*c* with respective overlapping portions lying between the portions 141-*a* and 141-*b* and between the portions 141-*b* and 141-*c*. A tag 142 is composed of portions 142-*a*, 142-*b*, and 142-*c* colored differently. The present condition of the tag can be recognized at a first glance through color discrimination. A tag 143 is composed of portions 143-*a*, 143-*b*, and 143-*c* configured differently. The present condition of the tag can be recognized based on the configuration thereof. A tag 144 is composed of portions 144-*a*, 144-*b*, and 144-*c* each having a concentric ellipsoidal configuration. Although the tags are configured as rectangles, triangles, or circles in the examples shown in FIG. 14, they may be configured as polygons other than those shown in FIG. 14. Alternatively, the tags may also have configurations similar to circles or polygons.

Figure 4:
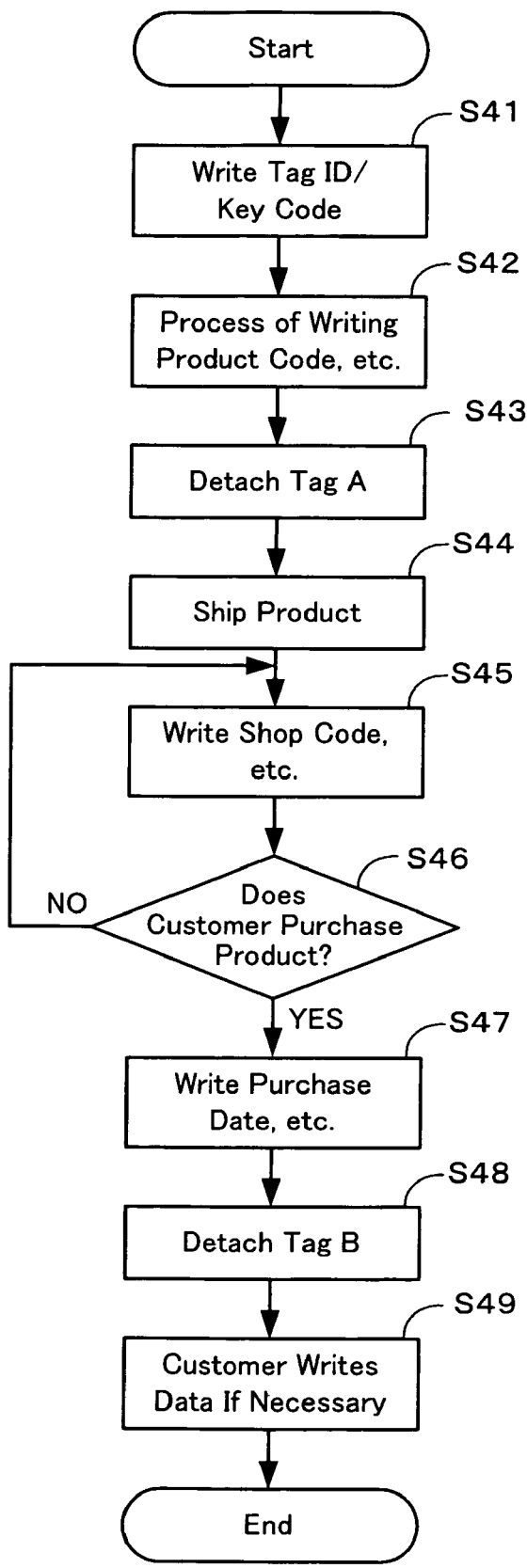
FIG. 4 is a flow chart diagram showing the flow of processing in the process of merchandise distribution in a first embodiment of the present invention.
Figure 5:
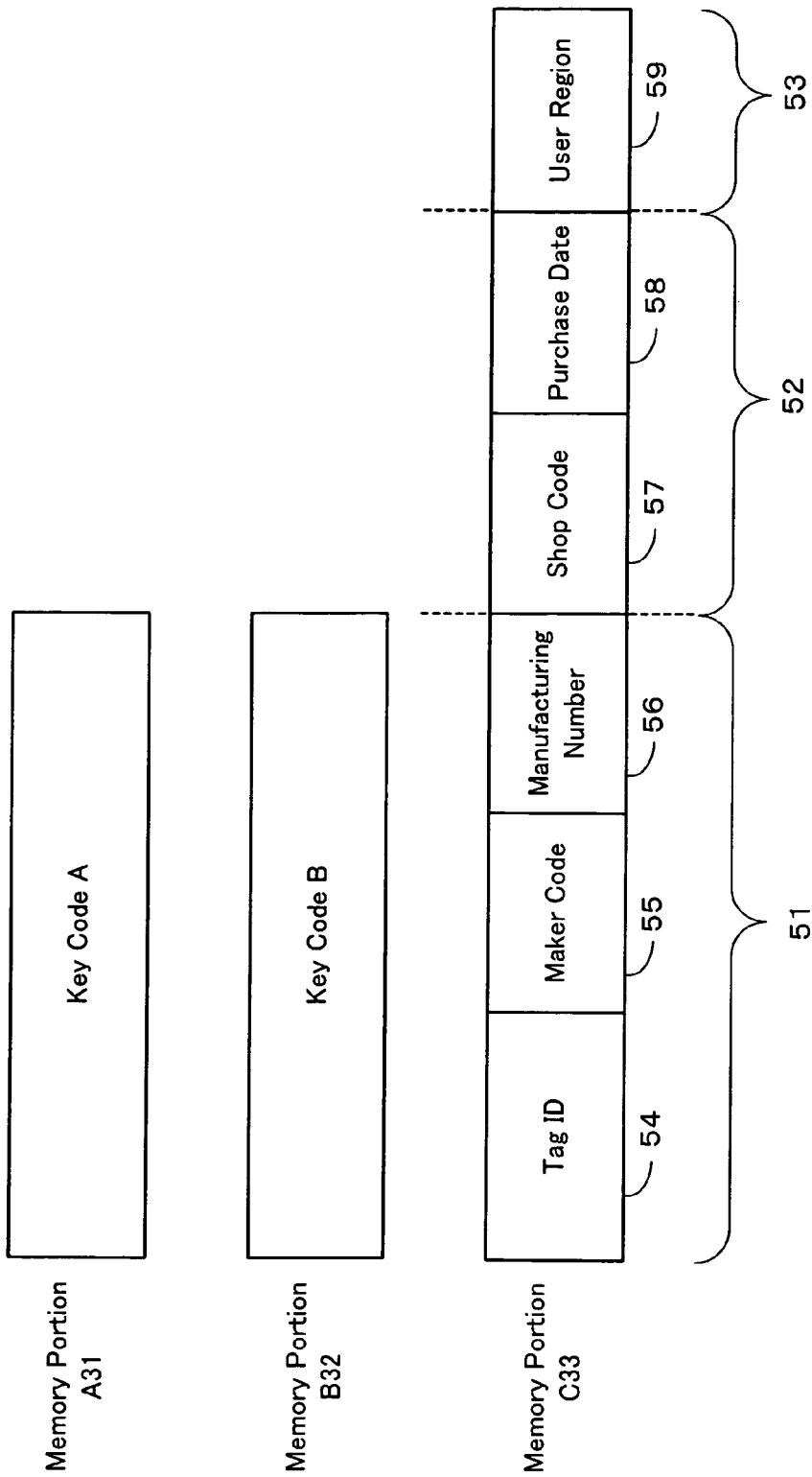
FIG. 5 shows an example of the configuration of a format of data stored in a memory portion in the first embodiment of the present invention.

Referring to the drawings, a tag according to a first embodiment of the present invention will be described herein below. The tag according to the present embodiment is an example obtained by applying the present invention to the management of merchandise distribution. The description will be given with reference to FIGS. 4 to 9. FIG. 4 is a flow chart diagram showing the flow of processing in the process of merchandize distribution according to the present embodiment. FIG. 5 shows an example of the configuration of data recorded in the memory portions A, B, and C according to the present embodiment.

As shown in FIG. 5, a key code A has been written in the memory portion A31. The key code A according to the present embodiment is generated based on the content of a tag ID 54. Likewise, a key code B is written in the memory portion B32. The key code B is generated based on the content of the tag ID 54. The memory portions A31 and B32 are memory areas which are writable only by a merchandise maker or a tag manufacturer. In the memory portion C33, there are written the tag ID 54, a maker code 55, a manufacturing number 56, a shop code 57, a purchase date 58, a user region 59, and the like. The memory portion C33 is roughly divided into three memory areas. A memory area 51 is a memory area for a maker which is writable only by the maker. A memory area 52 is a memory area for a shop which is writable only by the shop. A memory area 53 is a memory area for a user which is writable by anybody without a particular restriction.

The tag ID 54, the maker code 55, and the manufacturing number 56 are data written by the maker and belong to the memory area 51 for a maker. The shop code 57 and the purchase date 58 are data written by the shop and belong to the area 52 for a shop. The user region 59 is data that can be written freely by a consumer and belongs to the memory area 53 for a user.

Figure 6:
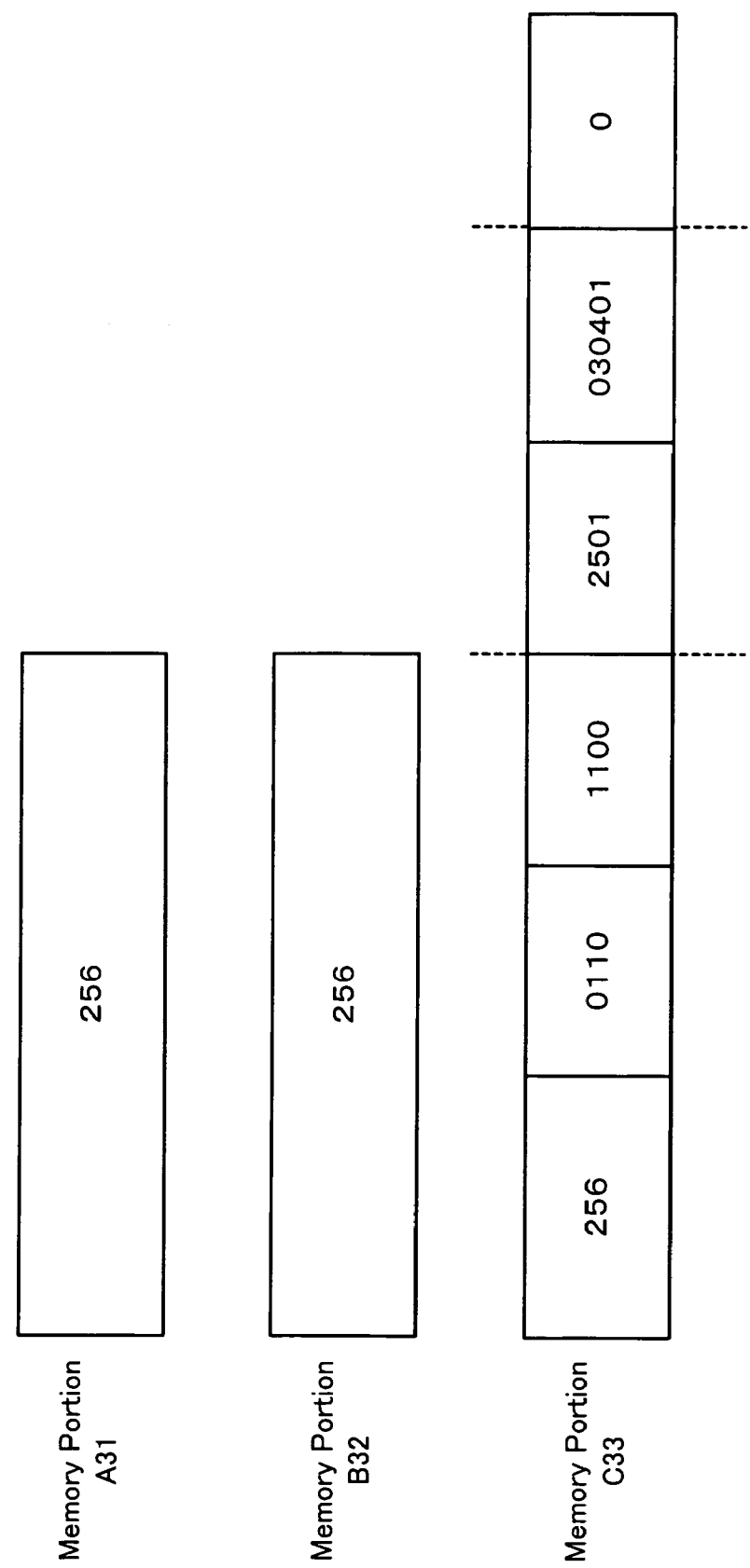
FIG. 6 shows an example of the configuration of the format of data stored in the memory portion in the first embodiment of the present invention.
Figure 9:
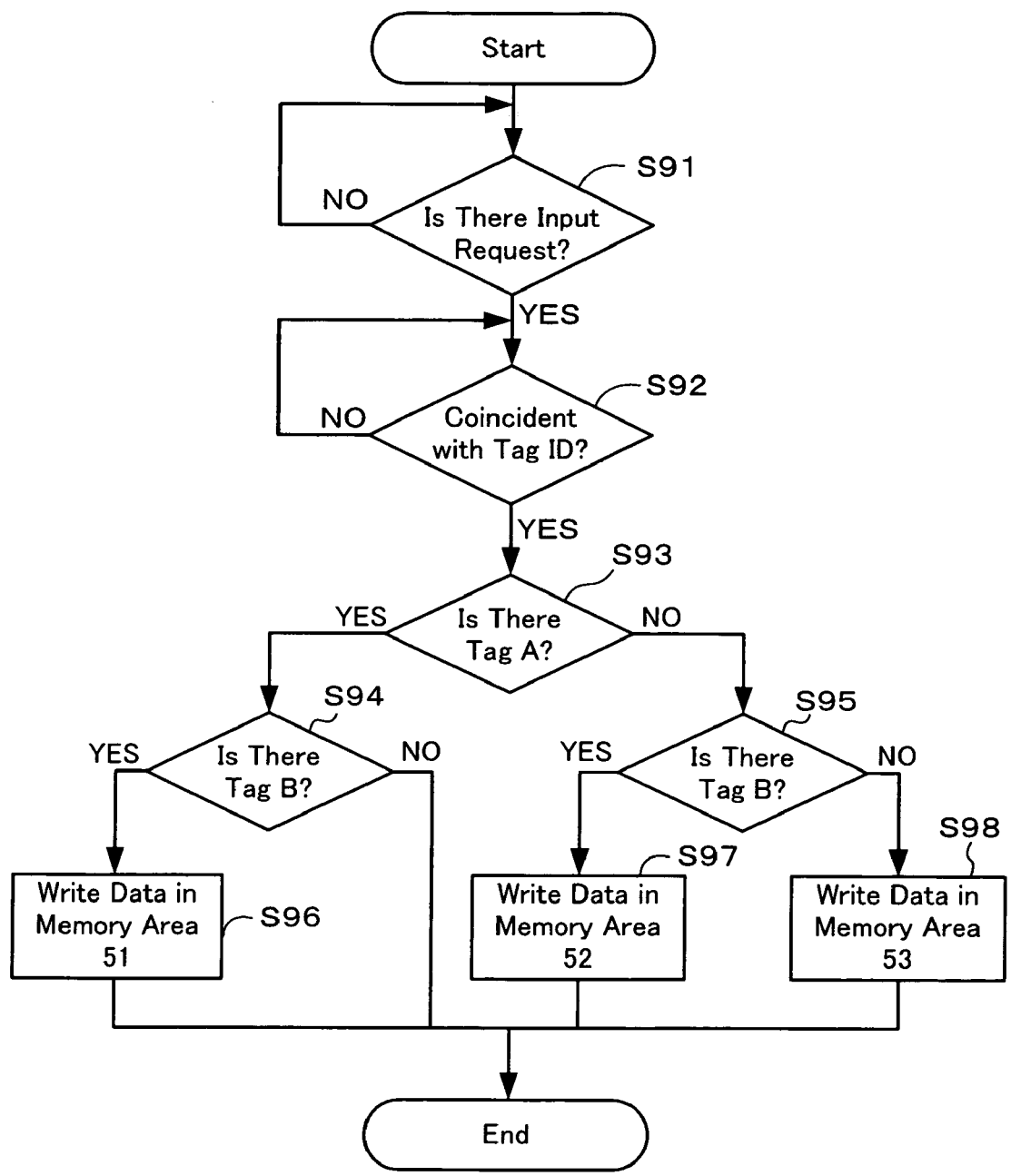
FIG. 9 is a flow chart diagram showing the flow of processing in response to an input request from the control portion in the first embodiment of the present invention.

FIG. 6 shows an example related to the types of data actually recorded in the memory portions A, B, and C. FIG. 4 is a flow chart diagram showing the flow of processing in the control portion 35 of FIG. 3 in response to an input request from outside the tag. FIG. 9 is a flow chart diagram showing the flow of processing in the control portion 35 of FIG. 3 in response to an output request from outside the tag. Processing in the process of merchandise distribution will be described in accordance with the flow chart of FIG. 4.

First, at the maker, the tag ID 54 is imparted first to a tag by using a reader/writer device for reading and writing data from and in the tag (Step S41). The tag ID 54 is an ID specific to the tag and used to identify the individual tag. In reading data in a tag therefrom or writing data therein also, the reading or writing of data can be performed only with respect to the specified tag by specifying the tag ID. In imparting the tag ID, the tag ID 54 is written in the memory portion C33 (FIG. 5) and the key codes A and B generated based on the tag ID 54 are written in the respective memory portions A31 and B32.

Although the key codes A and B are anything but the tag ID 54 in the present embodiment, the key codes A and B may also be automatically generated from the tag ID based on a specified rule, inputted from the outside, or encryptions generated based on the tag ID by placing emphasis on security.

The imparting of the tag ID may also be performed in a manufacturing process for the tag by the manufacturer of the tag different from the merchandise maker.

Before shipping merchandise to the shop, the maker affixes the above-mentioned tag comprising the detachable portions to the merchandise. A place to which the tag is to be affixed may be any provided that read write operations can be performed at the position by using a device. For example, the tag may be affixed to the surface of a box in which the merchandise is sealed, as shown in FIG. 2. The maker further writes the maker code 55, the product code 56, and the like by using the reader/writer device for reading and writing data from and in the tag (Step S42). After writing the necessary data, the maker detaches the portion of the tag A (Step S43) and ships the merchandise to the shop in that state (Step S44). As a result, the tag affixed to the merchandise is composed only of the tags B and C. The shop writes the shop code 57 and the like by using the reader/writer device for reading and writing data from and in the tag (Step S45).

When a customer has purchased the merchandise (Step S46), the shop further writes the date 58 of purchase by the customer (Step S47). Processing in Step S45 and processing in Step S47 may also be performed simultaneously, not individually. After writing the data, the shop detaches the second tag B (Step S48) and gives the merchandise to the customer. As a result, the tag affixed to the merchandise is composed only of the tag C.

If necessary, the customer who has purchased the merchandise is allowed to write data 59 by using the reader/writer device for reading and writing data from and in the tag (Step S49). By forming the finally remaining tag (C) 1-c with the control portion 35 and the input/output interface portion 34, the advantage is offered that, even when the tags are detached successively in the distribution process, various control operations for communication with the outside, the writing/reading of data, and the like can be performed until the last moment.

Figure 8:
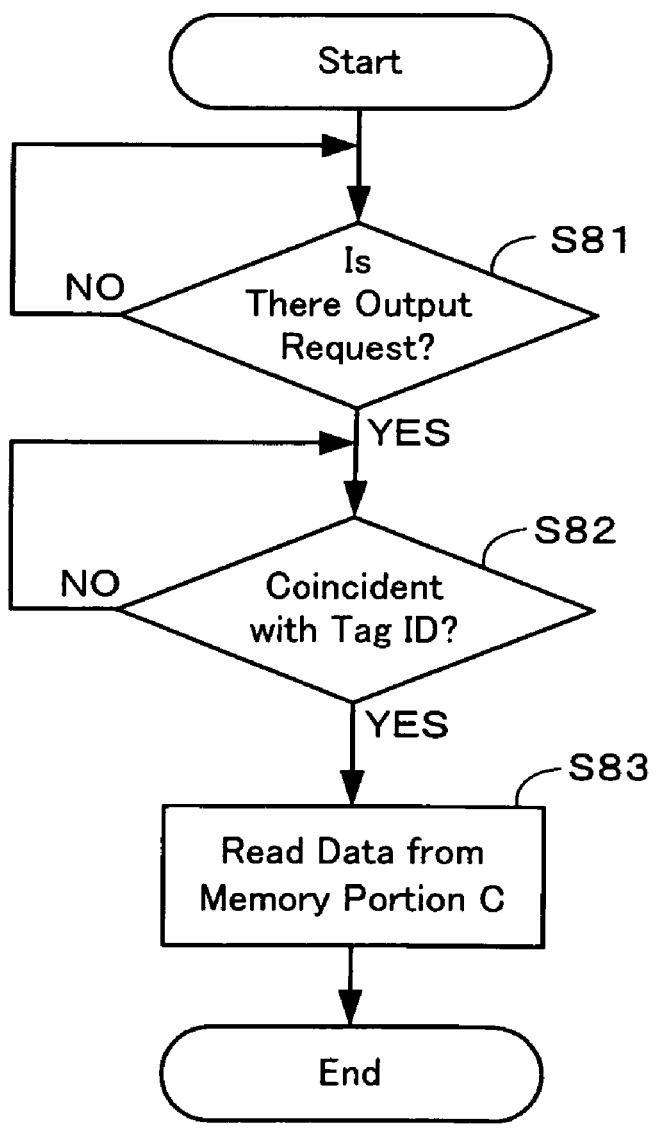
FIG. 8 is a flow chart diagram showing the flow of processing in response to an output request from a control portion in the first embodiment of the present invention.

With regard to the foregoing flow, a description will be given to the operation of the control portion 35 in the tag with reference to the flow chart diagrams of FIGS. 8 and 9. The description will be given first to the operation when an output (read) request has been issued in accordance with the flow chart of FIG. 8. Upon receipt of a data read request (output request) from the outside through the input/output interface portion 34 (Step S81), the control portion 35 checks whether or not the tag ID 72 specified by the read request is coincident with the tag ID 54 stored in the memory portion C in the tag (Step S82). When the two tag IDs are coincident, the control portion 35 reads data from the memory portion C and outputs the data to the outside through the input/output interface (Step S83). In the present embodiment, the reading of data is permitted to anybody.

A description will be given next to the operation when an input (write) request has been issued with reference to the flow chart of FIG. 9. The description will be given also to the configuration of the tag shown in FIGS. 3, 5, and 7, if necessary. Upon receipt of a data write request from the outside through the input/output interface portion 34 (Step S91), the control portion 35 checks whether or not the tag ID 75 specified by the write request is coincident with the tag ID 54 stored in the memory portion C in the tag (Step S92). When the tag ID 75 is coincident with the tag ID 54, the control portion 35 judges whether or not the tag A is present (Step S93). A method for the judgment is implemented based on whether or not the key code A can be read from the memory portion A31 in the tag A (1-a). When the key code A cannot be read therefrom, it is judged that the tag A is not present. Even though any data can be read out, when the data cannot be judged to be a normal key code, the control portion 35 judges that the tag A is not present. Since the key code A is the tag ID 54 in the present embodiment, another method may also be implemented which judges that the tag A is not present when the tag ID 75 specified by the write request is not coincident with the key code A.

In processing in Step S93, when it is judged that the tag A is present, the control portion 35 further judges whether or not the tag B is present (Step S94). The control portion 35 also judges whether or not the tag B is present depending on whether or not the key code B can be read from the memory portion B in the tag B. When the key code B cannot be read, the control portion 35 determines that the tag B is not present. When it is judged that the tag B is present in the processing in Step S94, the control portion 35 writes the data 76 to be written that has been inputted from the outside in the memory area 51 of the memory portion C33 (1-c) in the tag C (Step S96). In the state in Step S96, the control portion 35 does not perform any writing with respect to the memory area of the memory portion C33 (1-c) in the tag C other than the memory area 51.

When it is judged that the tag B is not present in the processing in Step S94, the control portion 35 ends the whole process flow without doing anything due to an abnormal state where the tag B is not present irrespective of the presence of the tag A. When it is judged that the tag A is not present in the processing in Step S93, the control portion 35 judges whether or not the tag B is present without being detached (Step S95). A method for the judgment is implemented in the same manner based on whether or not the key code B can be read from the memory portion B32 in the tag B (1-b). When the key code B cannot be read out at all, the control portion 35 judges that the tag B is not present.

When it is judged that the tag B is present, the control portion 35 writes the data 76 to be written that has been inputted from the outside to the memory area 52 of the memory portion C33 in the tag C (Step S97). In the state in Step S97, the control portion 35 does not perform any writing with respect to the memory area of the memory portion C33 in the tag C other than the memory area 52.

When it is judged that the tag B is not present in Step S95, the control portion 35 writes the data 76 that has been inputted from the outside to the memory area 53 of the memory portion C33 in the tag C (Step S98). In the state in Step S98, the control portion 35 does not perform any writing with respect to the memory area of the memory portion C33 in the tag C other than the memory area 53.

Although the reading/writing of data is enabled in the foregoing embodiment provided that only the tag ID is specified from the external reader/writer device and coincident, it is also possible to add a process of inputting a keyword along with the tag ID from the external reader/writer device and judging whether or not the inputted keyword is coincident with the key code stored in the memory portion in the tag.

The judgment may also be performed appropriately by using a combination of the keyword and the tag ID. This allows security to be further reinforced.

Referring to the drawings, a description will be given next to a tag according to a second embodiment of the present invention.

The second embodiment relates to a functional tag comprising means for changing the function through detachment. The tag according to the present embodiment will be described herein below with reference to FIGS. 10 to 13.

Figure 10:
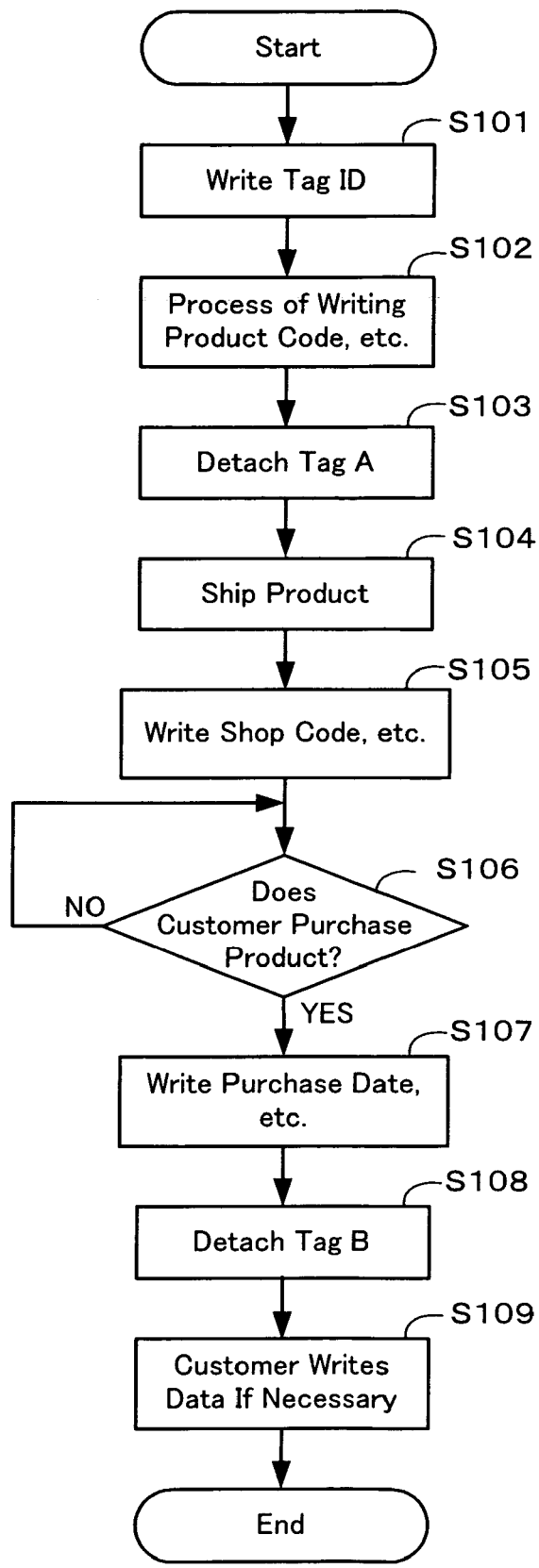
FIG. 10 is a flow chart diagram showing the flow of processing in the process of merchandise distribution in a second embodiment of the present invention.
Figure 11:
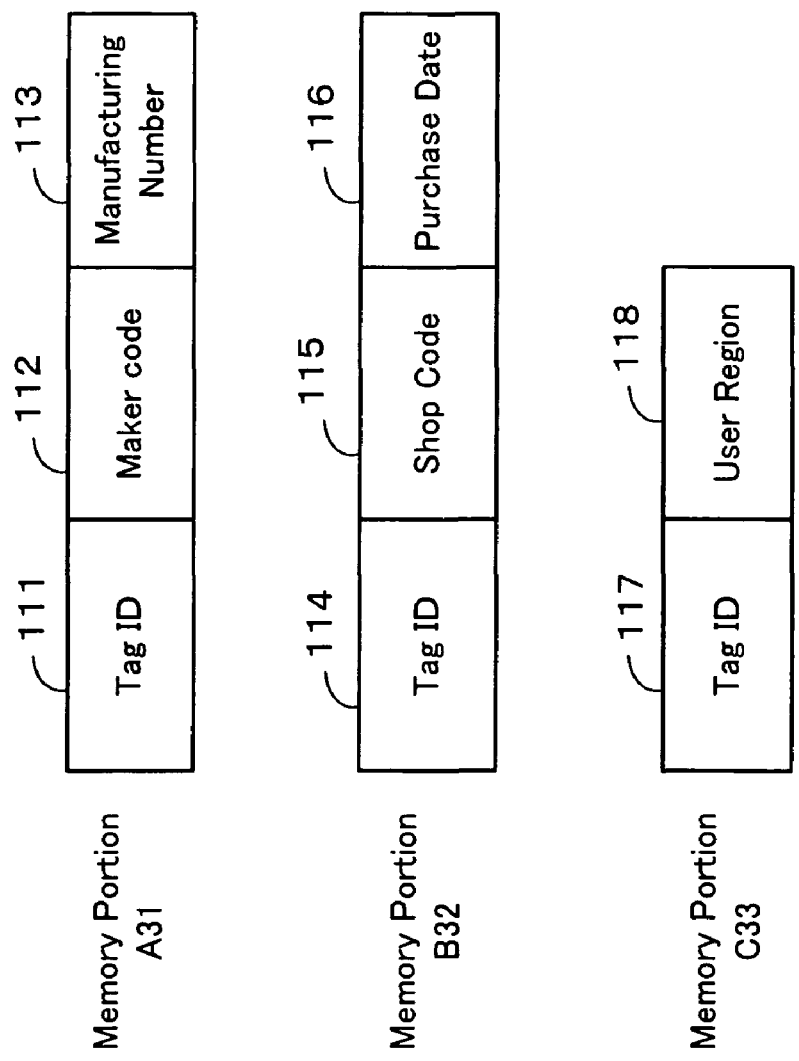
FIG. 11 shows an example of the configuration of a format of data stored in a memory portion in the second embodiment of the present invention.

FIG. 10 is a flow chart diagram showing the process of merchandise distribution using the tag according to the second embodiment of the present invention. FIG. 11 shows the respective types of data stored in the memory portions A, B, and C in the present embodiment.

As shown in FIG. 11, a tag ID 111, a maker code 112, and a manufacturing number 113 are written in the memory portion A31. A tag ID 114, a shop code 115; and a purchase date 116 are written in the memory portion B32. A tag ID 117 and user information 118 are written in the memory portion C33. The tag IDs 111, 114, and 117 are written in the respective memory portions A31, B32, and C33 only by the manufacturer of the tag at the stage of the manufacturing of the tag.

The tag is constituted to allow no writing at all in the subsequent process. The tag IDs 111, 114, and 117 are the same ID. The memory portion A31, except for the tag ID 111, allows only the maker of the merchandise to which the tag is attached to perform the reading/writing of data with respect thereto. The memory portion B32, except for the tag ID 114, allows only the shop selling the merchandise to perform the reading/writing of data with respect thereto. The memory portion C33, except for the tag ID 117, allows anybody including a customer to perform the reading/writing of data with respect thereto.

Figure 12:
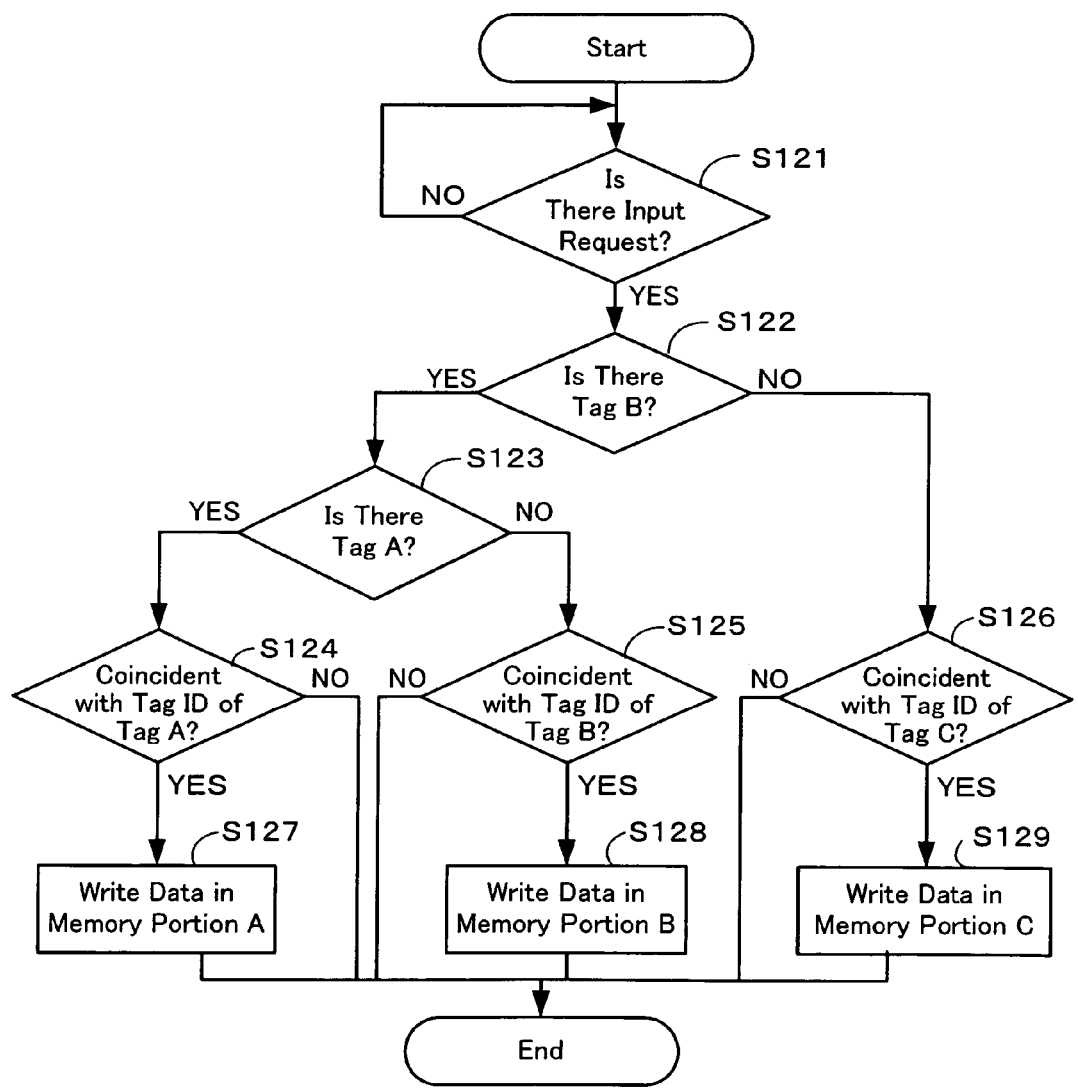
FIG. 12 is a flow chart diagram showing the flow of processing in response to an output request from a control portion in the second embodiment of the present invention.
Figure 13:
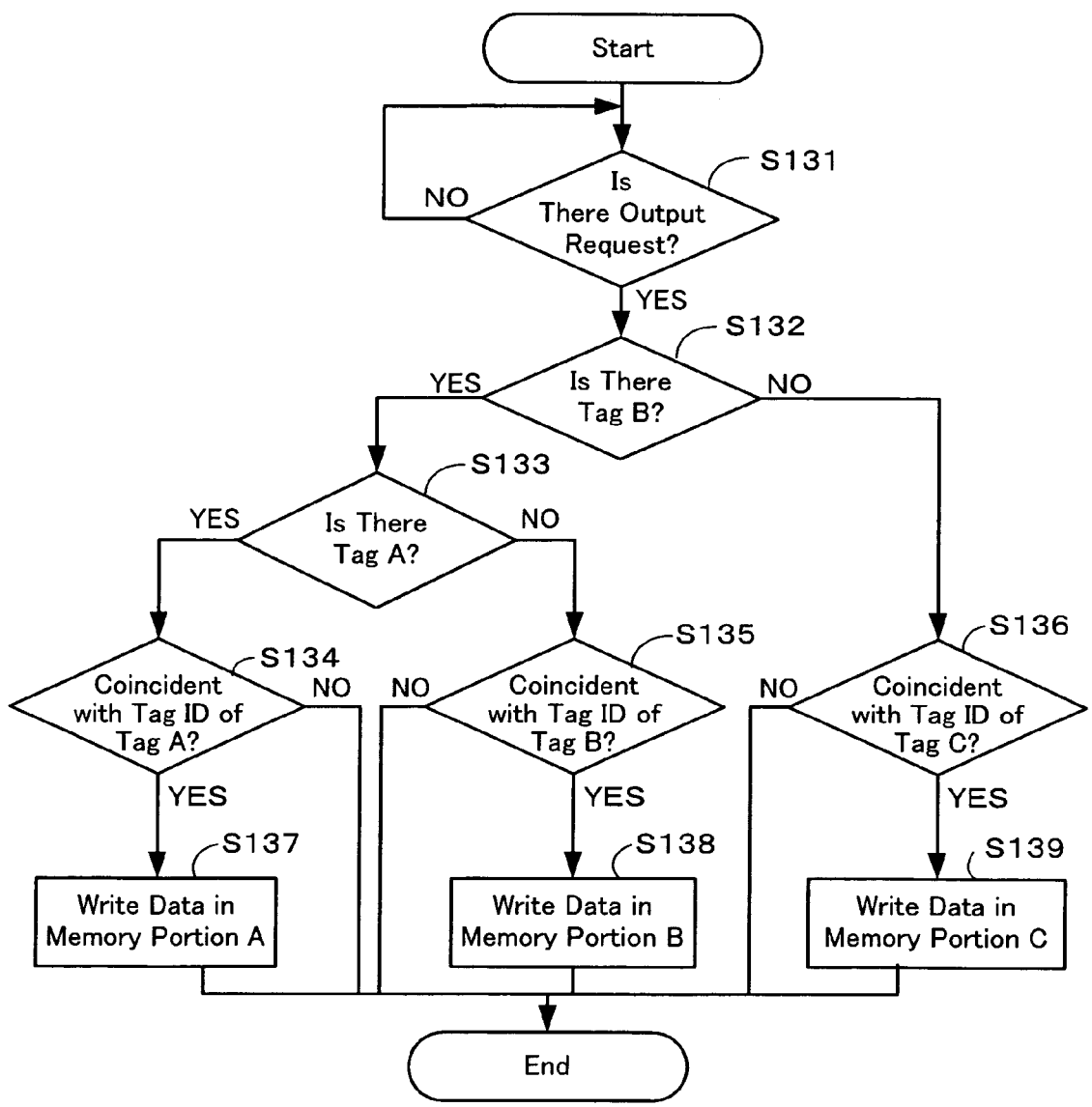
FIG. 13 is a flow chart diagram showing the flow of processing in response to an input request from the control portion in the second embodiment of the present invention.

FIG. 12 is a flow chart diagram showing the flow of processing in the control portion 35 of FIG. 3 in response to an input request from outside the tag in the present embodiment. FIG. 13 is a flow chart diagram showing the flow of processing in the control portion 35 of FIG. 3 in response to an output request from outside the tag in the present embodiment. A description will be given first to the flow of processing in the process of merchandise distribution with reference to FIG. 10. As also shown in FIG. 11, the tag IDs 111, 114, and 117, which are the same, have already been written in the tag ID memory regions of the respective memory portions of the tags A, B, and C at the stage of manufacturing the tag (Step S101).

The maker affixes a tag comprising detachable portions to merchandise before shipping the merchandise to a shop and writes therein the maker code 112, the product code 113, and the like by using a reader/writer device for reading and writing data from and in the tag (Step S102). After writing the necessary data, the maker detaches the portion of the tag A including the memory portion A31 (Step S103) and ships the merchandise in that state to the shop (Step S104). As a result, the tag affixed to the product (merchandise) is composed only of the tags B and C. By holding the detached tag A without discarding it, the maker is allowed to use the detached tag A to check the content of warranty in the event of repair under warranty or manage the shipped merchandise. In the case where an amount of data to be processed is huge in a large-scale shop or the like, only the content of data stored in the tag A may also be left appropriately as a database.

The shop writes the shop code 115 and the like by using a reader/writer device for reading and writing data from and in the tag (Step S105). When the shop sells merchandise and a customer purchases it (Step S106), the shop further writes the date on which it sold the merchandise (the purchase date 116 on which the customer purchased the merchandise) (Step S107). The processing in Step S105 and the processing in Step S107 may also be performed simultaneously (on the purchase date or the like). After writing the data, the shop detaches the second tag B (Step S108) and passes the merchandise to the customer. As a result, the tag affixed to the merchandise is composed only of the tag C.

By holding the detached tag B without discarding it, the shop is allowed to use the detached tag B to check the content of warranty in the event of repair under warranty or manage the sold merchandise. Likewise, it is also possible to hold only the content of data stored in the tag B as a database. If necessary, the customer who purchased the merchandise is allowed to write data 118 by using a reader/writer device for reading and wiring data from and in the tag (Step S109). For example, the written data may be used as a memo. Alternatively, events related to the merchandise may also be stored in time series. A description will be given next to the operation of the control portion 35 included in the tag with reference to the flow chart diagrams of FIGS. 12 and 13. The description will be given first to the operation when an output (read) request has been issued with reference to the flow chart of FIG. 13. If necessary, a reference will also be made to FIG. 3.

When there is a data read request from the outside through the input/output interface portion 34 (Step S131), the control portion 35 judges whether or not the tag B is present (Step S132). A method for the judgment allows sensing depending on, e.g., whether or not a circuit is in an electrically unconnected state (a high impedance state). When it is judged that the tag B is present in the processing in Step S132, the control portion 35 further judges whether or not the tag A is present (Step S133). A method for the judgment is the same as the method for judging the presence of the tag B and implemented by sensing, e.g., whether or not the circuit is in the electrically unconnected state (high impedance state). When it is judged that the tag A is present, the control portion 35 judges whether or not the tag ID 72 specified at the time of the read request is coincident with the tag ID 111 stored in the memory portion A of the tag A (Step S134).

When the tag ID is coincident in the processing in Step S134, the control portion 35 judges that the tags A and B are present so that it reads data from the memory portion A of the tag A and outputs it to the outside through the input/output interface portion 34 (Step S137).

When the tag ID is not coincident in the processing in Step S134, the control portion 35 ignores the read request and ends the whole process flow. When it is judged that the tag A is not present in the processing in Step S133, the control portion 35 judges whether or not the tag ID 72 specified at the time of the read request is coincident with the tag ID 114 stored in the memory portion B of the tag B (Step S135).

When the tag ID is coincident in the processing in Step S135, the control portion 35 reads data from the memory portion B in the tag B, because the tag A is not present but the tag B is present, and outputs the data to the outside through the input/output interface portion 34 (Step S138). When the tag ID is not coincident in the processing in Step S135, the control portion 35 ignores the read request and ends the whole process flow. When it is judged that the tag B is not present in the processing in Step S132, the control portion 35 judges whether or not the tag ID 72 specified at the time of the read request is coincident with the tag ID 117 stored in the memory portion C in the tag C (Step S136).

When the tag ID is coincident in the processing in Step S136, the control portion 35 reads data from the memory portion C in the tag C, because only the tag C is present, and outputs the data to the outside via the input/output interface portion 34 (Step S139).

When the tag ID is not coincident in the processing in Step S136, the control portion 35 ignores the read request and ends the whole process flow.

The description will be given next to the operation when an input (write) request has been issued in accordance with the flow chart of FIG. 12.

When there is a data write request from the outside through the input/output interface portion 34 (Step S121), the control portion 35 judges first whether or not the tag B is present (Step S122). A method for the judgment can be implemented by sensing, e.g., whether or not the circuit is in the electrically unconnected state (high impedance state) or the like. When it is judged that the tag B is present in the processing in Step S122, the control portion 35 further judges whether or not the tag A is present (Step S123). A method for the judgment is the same as the method for judging the presence of the tag B and implemented by sensing the state (high impedance state) in which, e.g., the circuit is electrically unconnected or the like.

When it is judged that the tag A is present, the control portion 35 judges whether or not the tag ID 75 specified at the time of the read request is coincident with the tag ID 111 stored in the memory portion A of the tag A (Step S124). When the tag ID is coincident in the processing in Step S124, the control portion 35 writes the data 76 in the memory portion A in the tag A, because both the tags A and B are present (Step S127). When the tag ID is not coincident in the processing in Step S124, the control portion 35 ignores the write request and ends the whole process flow. When it is judged that the tag A is not present in the processing in Step S123, the control portion 35 judges whether or not the tag ID 75 specified at the time of the write request is coincident with the tag ID 114 stored in the memory portion B of the tag B (Step S125).

When the tag ID is coincident in the processing in Step S125, the control portion 35 writes the data 76 in the memory portion B of the tag B, because the tag A is not present but the tag B is present (Step S128). When the tag ID is not coincident in the processing in Step S125, the control portion 35 ignores the write request and ends the whole process flow. When it is judged that the tag B is not present in the processing in Step S122, the control potion 35 judges whether or not the tag ID 75 specified at the time of the write request is coincident with the tag ID 117 stored in the memory portion C of the tag C (Step S126).

When the tag ID is coincident in the processing in Step S126, the control portion 35 writes the data 76 in the memory portion C in the tag C, because only the tag C is present (Step S129). When the tag ID is not coincident in the processing in Step S126, the control portion 35 ignores the write request and ends the whole process flow.

Although the input/output interface portion 34 and the control portion 35 are provided only in the tag C in each of the first and second embodiments described above, the input/output interface portion 34 and the control portion 35 may also be provided in the tag A or B. It is also possible to provide the input/output interface portion 34 and the control portion 35 in each of a plurality of tags. However, the provision of the input/output interface portion 34 and the control portion 35 in the finally remaining tag offers the advantage of improved read/write flexibility.

Figure 20:
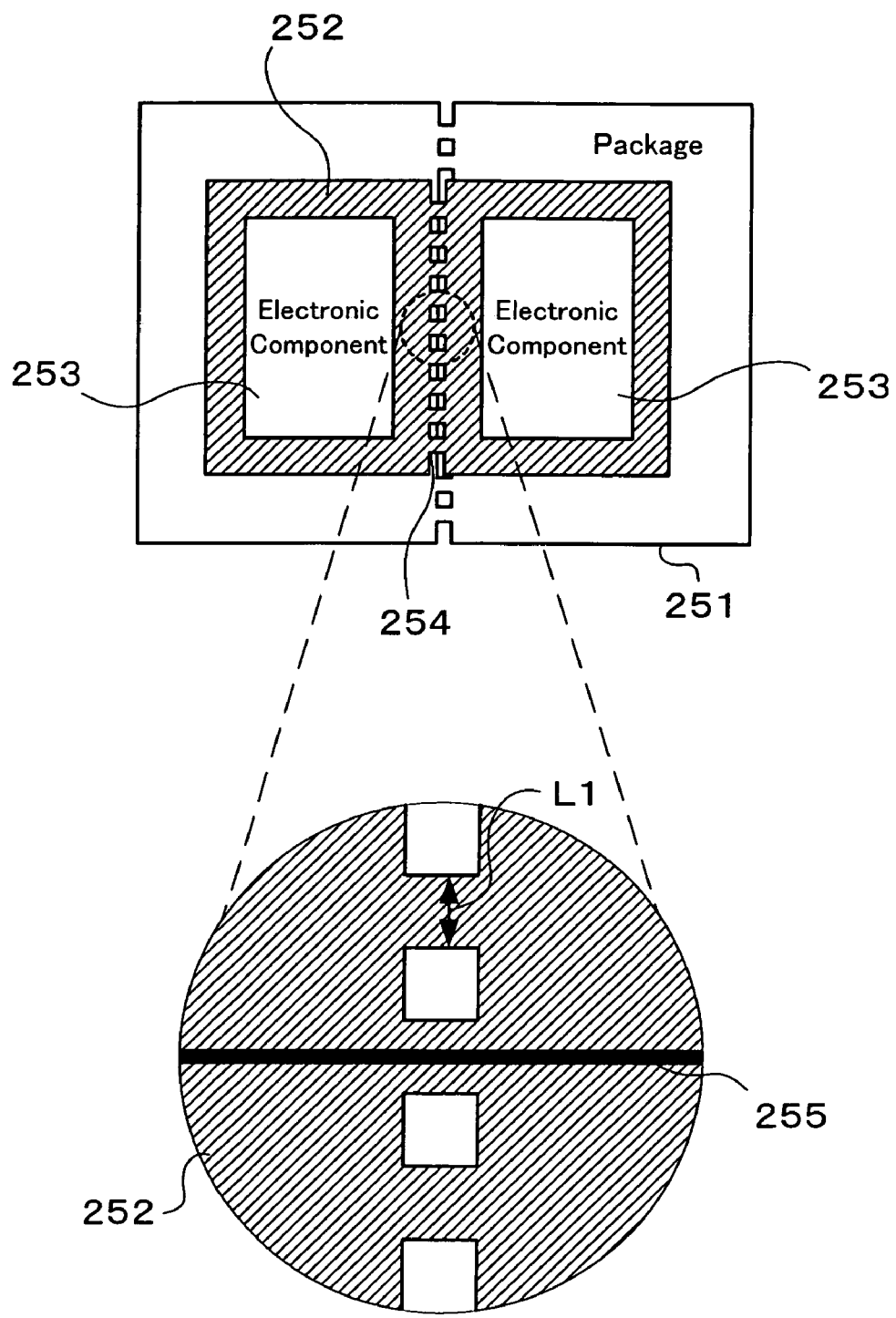
FIG. 20 are top views each showing in detail the structure of the detachment portion of the tag according to an embodiment of the present invention.

FIG. 20 are top views each showing in detail the structure of the detachment portion of the tag according to an embodiment of the present invention. As shown in FIG. 20(a), electronic components 253 each internally provided with the function of a tag have been mounted on a substrate 253 composing the tag and packaging using a packaging material 251 has been performed in such a manner as to cover the electronic components 253 and the substrate 252 (the approximate size of which is 20 mm length×10 mm width× 0.5 mm height). A perforation 254 has further been formed in the tag to allow the detachment of the tag into two parts therealong.

For the substrate 252, there can be used an insulating material such as a plastic material, a glass material, a ceramic material, a film material, or a vinyl-based material. As a specific example, a non-woven-glass-fabric-backed copper-clad epoxy laminate having a thickness of about 0.1 mm (GE-4F, JIS Standard: also termed FR-4) can be listed in consideration of the RF characteristic, cost, processing ease, strength, and detachment ease of the substrate. The electronic component 252 is composed of electronic circuits including an antenna and an RF circuit each used for the transmission/ reception of a radio signal, a control logic circuit for controlling the function of a tag, and a memory circuit (EEPROM, FeRAM, ROM, etc.) for storing data which have been packaged (mounted) on the substrate 252. Although FIG. 20 show an example in which the electronic components 253 are mounted on the upper side of the substrate 252, the electronic components 253 may also be mounted on the lower side of the substrate 252.

As a material used to compose the package 251 for protecting the electronic components from external environments such as moisture, temperature, light, and impact, a common packaging material used to seal an integrated circuit, such as a ceramic material or a plastic material, can be used provided that it allows the passage of a radio signal. However, a material excellent in heat resistance, solvent resistance, and chemical resistance, such as an epoxy resin or a silicon resin, is used more preferably to compose the package 251.

As shown in FIG. 20(b), a wire (e.g., a ground line, a signal line, or a power line) 255 which provides electrical connection between the two electronic components has also been formed on the surface of the substrate 252 or in the inside thereof. The wire 255 has been installed to pass exactly through a connecting portion of the perforation 254 provided for the detachment of a part of the tag. The material of the wire 255 is not particularly limited provided that it has conductivity. The wire installation can be implemented by a method such as the installation of a coated or non-coated metal wire, plating with a metal foil, etching, or conductive ink printing.

The perforation 254 has been formed by boring holes (of which the ones in the package 251 are not through holes) at, e.g., regular spacings L1 in the package 251 and the substrate 252. Each of the spacings L1 between the holes of the perforation 254 has been adjusted to a value (e.g., 0.2 mm) which allows easy detachment of the tag and also allows the retention of a sufficient strength before detachment.

Figure 21:
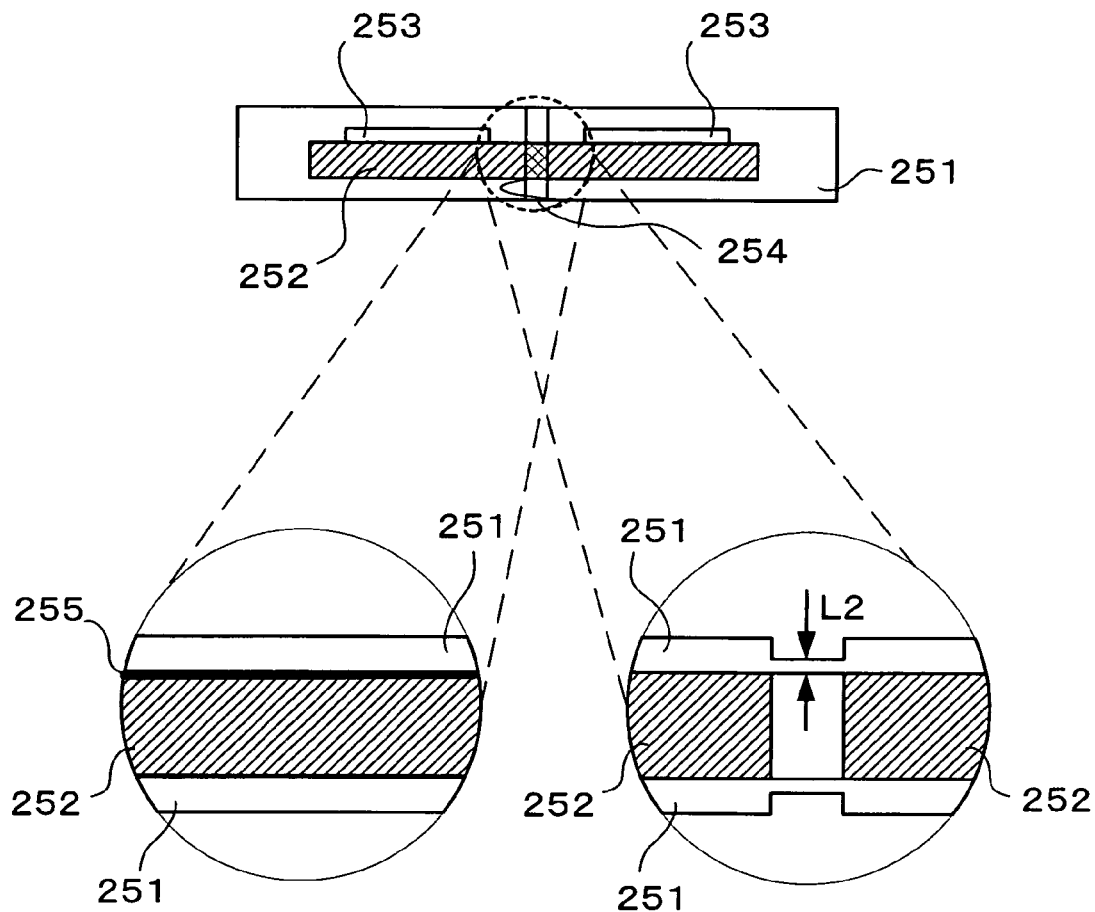
FIG. 21 are cross-sectional views each showing in detail the structure of the detachment portion of the tag according to the embodiment of the present invention.

FIG. 21 are cross-sectional views each showing in detail an example of the structure of the detachment portion of the tag according to the embodiment of the present invention. As shown in FIG. 21(a), the electronic components 253 each internally provided with the above-mentioned function of a tag have been mounted on the substrate 252 and covered with the package 251 from the outside thereof. The perforation 254 has further been formed in the tag to allow a part of the tag to be detached therealong.

FIG. 21(b) is a view obtained by enlarging the connecting portion of the perforation of FIG. 20(a). The wire 255 has been formed on the surface of the portion unformed with the holes of the perforation 254.

FIG. 21(c) is a view obtained by enlarging a gap portion of the perforation of FIG. 21(a) shown thereabove. The structure of the perforation 254 is such that through holes have been bored in the substrate 252 present in the package 251, while non-through holes, not through holes, have been bored in the package 251 to reduce the thickness of the package 251 (e.g., Thickness L2 of Hole Portion of Package=0.1 mm). This is for preventing a toxic substance such as light, moisture, or a chemical from entering the substrate 252 or the electronic components 253 and preventing the substrate 252 or the electronic components 253 from corroding and abnormally functioning under the influence thereof.

Figure 22:
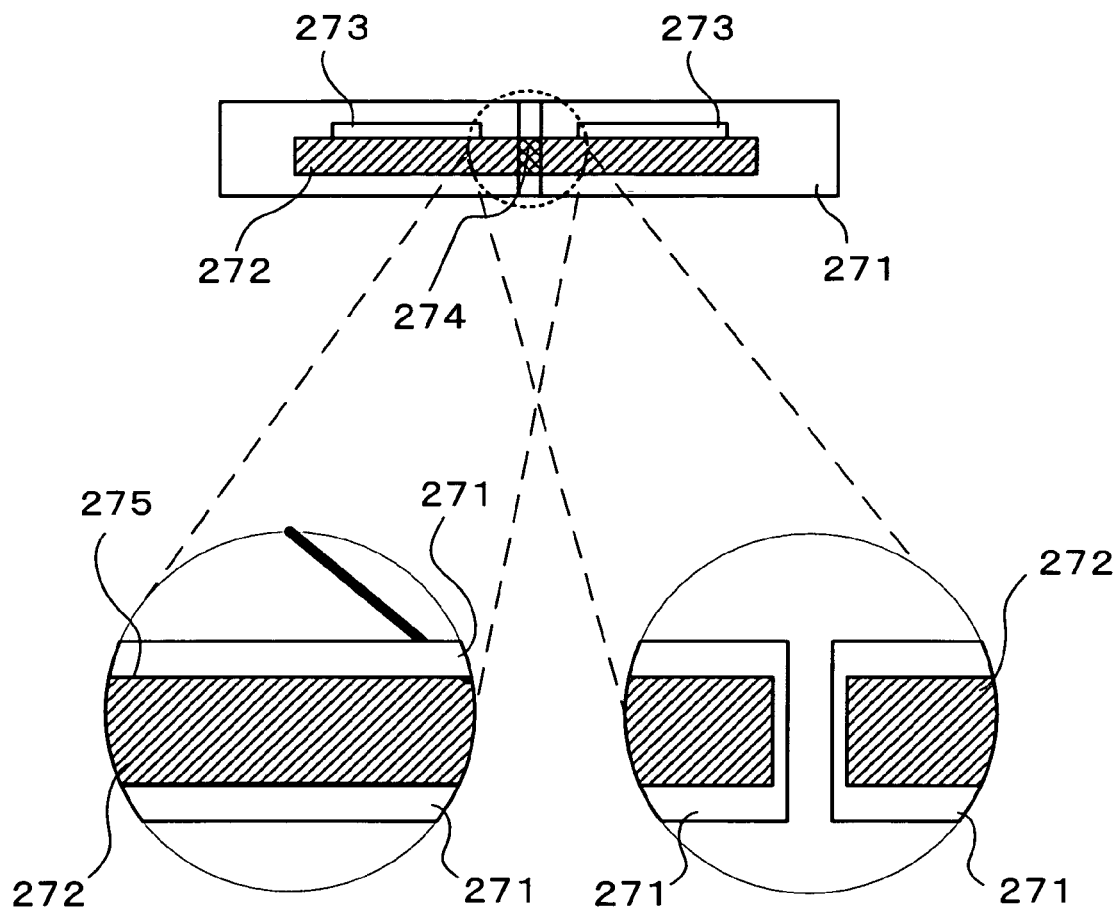
FIG. 22 are cross-sectional views each showing in detail the structure of the detachment portion of the tag according to an embodiment of the present invention, which is other than the one shown in FIG. 21.

FIG. 22 are cross-sectional views each showing in detail the structure of the detachment portion of the tag other than the tag of FIG. 21. FIG. 22 are different from FIG. 21 in that, as shown in FIG. 22(c), the holes forming the perforation 274 are through-holes penetrating both of the package 271 and the substrate 272. However, the package 271 completely covers the substrate 272 to prevent the substrate 272 from being exposed directly to external environments. Even when the through-holes have thus been bored, the substrate 252 or the electronic components 253 can therefore be protected from a toxic substance such as light, moisture, or a chemical.

Figure 23:
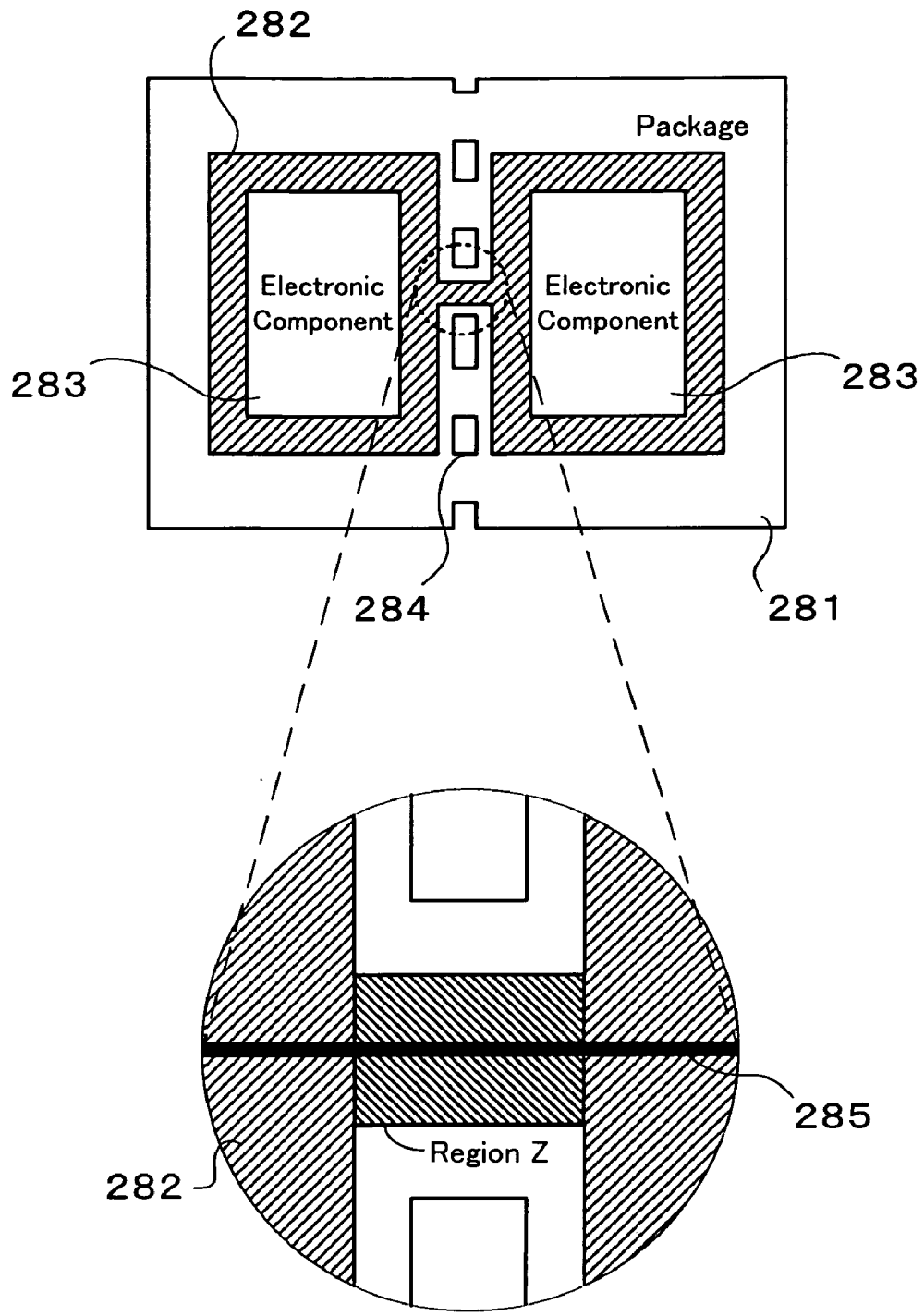
FIG. 23 are top views each showing in detail the structure of the detachment portion of the tag according to an embodiment of the present invention, which is other than the ones shown in FIGS. 21 and 22.

FIG. 23 are top views showing in detail the structure of the detachment portion of the tag according to another embodiment of the present invention.

The tag shown in FIG. 23 is different from the tag shown FIGS. 21 and 22 in that the portion of the substrate 282 corresponding to the perforation has been cut except for the region Z through which the wire 285 passes. As for the package 281, it has been perforated in the same manner as in the tag shown in FIG. 21. Although the structure of the tag has thus been described by using several examples, the perforation is not limited to the structures shown above by way of example provided that it allows easy detachment and does not impair the function of a tag.

Figure 16:
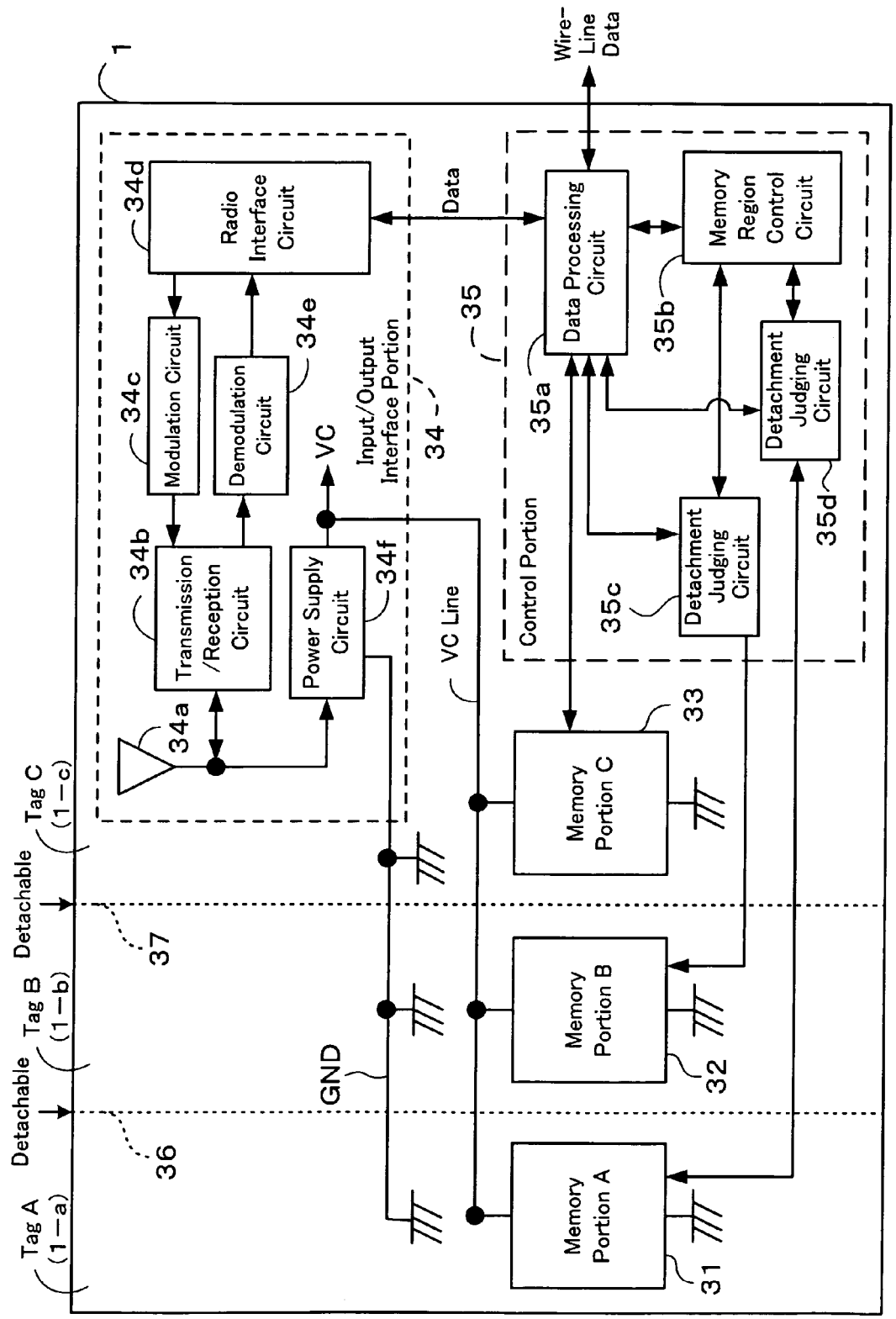
FIG. 16 is a block diagram showing in greater detail an example of the inner configuration of the tag according to an embodiment of the present invention.

FIG. 16 is a block diagram showing in greater detail an example of the internal configuration of the tag according to an embodiment of the present invention. As shown in FIG. 16, the tag 1 according to the present embodiment can be divided into the tag A(1-a), the tag B(1-b), and the tag C(1-c). Between the tags A and B, the perforated split line 36 has been provided to allow easy detachment of a part of the tag and allow detachment between the tags A and B therealong. The perforated split line 37 has also been provided between the tags B and C to allow detachment between the tags B and C therealong. Before the a part of the tag is detached, a ground (GND) line and a power (VC) line are connected to each other over the tags A, B, and C.

In the tag A, the memory portion A31 is included. In the tag B, the memory portion B32 is included. In the tag C, the memory portion C33, the input/output interface portion 34, and the control portion 35 are provided. The input/output interface portion 34 forms an interface for exchanging data with an external reader/writer device (not shown). In the input/output interface portion 34, there are provided an antenna (e.g., a coil antenna) 34a for transmission and reception, a transmission/receiving circuit 34b, a modulation circuit 34c, a radio interface circuit 34d, a demodulation circuit 34e, and a power source circuit 34f.

The antenna 34a for transmission and reception has the function of receiving a radio signal transmitted from an external reader/writer device not shown or transmitting a radio signal to the external reader/writer device not shown. The transmission/receiving circuit 34b has the function of performing the filtering, amplification, and frequency conversion of the radio signal received by the antenna 34a for transmission and reception or the function of performing the filtering, amplification, frequency conversion, and digital/analog conversion of the radio signal to be transmitted from the antenna 34a for transmission and reception.

The modulation circuit 34c has the function of modulating data to be transmitted to the external reader/writer device not shown to a radio signal. The demodulation circuit 34e has the function of demodulating a demodulation signal received by the antenna 34a for transmission and reception. The radio interface circuit 34d has the function of changing a data format for the radio signal demodulated by the demodulation circuit 34e, such as the removal of an unneeded portion as received data or the like, and transferring the resulting signal to the data processing circuit 35a of the control portion 35. The radio interface circuit 34d also receives data to be transmitted from the data processing circuit 35a, changes the data format thereof such that it is transmitted as a radio signal, and transferring the resulting data to the modulation circuit 34c.

The frequency band of transmitted/received radio signals is, e.g., a band not higher than 135 kHz, a 13.56 MHz band, a 860 MHz to 911 MHz band, a 2.45 GHz band, or the like. By changing the configuration of the antenna 34a for transmission and reception and that of the transmission/receiving circuit 34b in accordance with the frequency band of radio signals in use, the frequency band of transmitted/received radio signals can be changed. A modulation/demodulation method to be used is, e.g., ASK (Amplitude Shift Keying), FSK (Frequency Shift Keying), OOK (On-Off Keying), or the like. By changing the configuration of the modulation circuit 34c and that of the demodulation circuit 34e in accordance with a modulation/demodulation method to be used, a modulation/demodulation method to be used can be changed.

The power supply circuit 34f has the function of extracting power by using the phenomenon of electromagnetic induction from the radio signal (electromagnetic wave) transmitted from the external reader/writer device not shown and received by the antenna 34a for transmission and reception and supplying the power of the power supply voltage VC to the circuits in the tag (which will be described later). The power supply circuit 34f can also use a power generator such as a battery instead of having the above-mentioned function of extracting the power from the radio signal. A power supply line for the power supply voltage VC (e.g., 1.5 V) supplies power not only to the circuits in the tag C but also to each of the memory portion A31 of the tag A and the memory portion B32 of the tag B. The control portion 35 receives a request inputted thereto from the input/output interface portion 34 and controls the function of the tag. The control portion 35 has a data processing circuit 35a, a memory region control circuit 35b, and disconnection judging circuits 35c and 35d.

The data processing circuit 35a has the function of judging whether or not received data transferred from the radio interface circuit 34d should be stored in any memory region based on the content of the received data and on information obtainable from the memory region control circuit 35b and writing the received data in any of the memory portions A, B, and C in which the corresponding memory region exists. The data processing circuit 35a also has the function of judging, when the received data is a data read instruction from the external reader/writer device not shown, the memory region from which data to be transmitted should be read based on the content of the read instruction and on the information obtainable from the memory region control circuit 35b and reading the data to be transmitted from any of the memory portions A, B, and C in which the corresponding memory region exists. The data processing circuit 35a also has a function as an interface when data is written or read in or from the tag 1 by using a wire line. In the case where data is not read or written by using a wire line, however, the function as the interface described above may also be omitted. The data processing circuit 35a further performs a control operation with respect to each of functional blocks (FIG. 17: an input potential determining circuit 86, a high impedance judging circuit 87, an input/output control circuit 88, and a switch 89) in the disconnection judging circuit 35c and each of the functional blocks (the transmission/receiving circuit 34b, the modulation circuit 34c, the radio interface circuit 34d, the demodulation circuit 34e, and the power supply circuit 34f) in the input/output interface portion.

The memory region control circuit 35b has the function of recognizing the current state of detachment of the tag I based on tag detachment information obtainable from the detachment judging circuits 35c and 35d, judges a memory region in which received data can be written and a memory region from which data to be transmitted can be read, and transmitting information on the writable memory region or on the readable memory region to the data processing circuit 35a.

The detachment judging circuit 35c has the function of judging whether or not the transmission/reception of data with the memory portion B32 is possible and transmitting information on whether or not the tag B has been detached to the memory region control circuit 35b. The detachment judging circuit 35d has the function of judging whether or not data transmission/reception with the memory portion A31 is possible and transmitting information on whether or not the tag A has been detached to the memory region control circuit 35b. Each of the detachment judging circuits 35c and 35d has the function of protecting the internal circuits from static electricity or the like when the tag which transmits/receives data has been detached.

Figure 17:
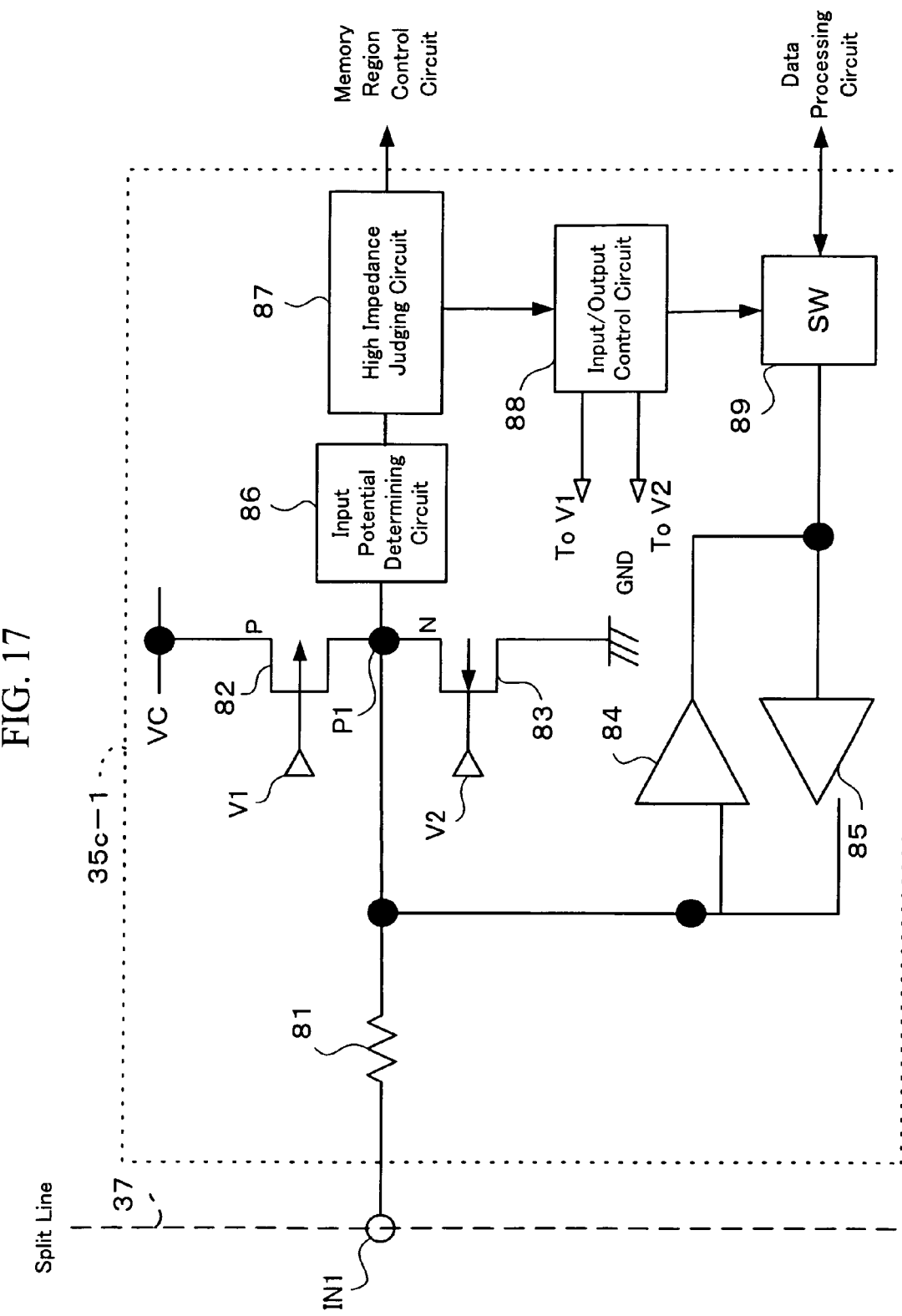
FIG. 17 is a block diagram showing in detail the configuration of a detachment judging circuit according to an embodiment of the present invention.

FIG. 17 is a block diagram showing in detail the configuration of a detachment judging circuit according to an embodiment of the present embodiment. A description will be given to the configuration of the detachment judging circuit in accordance with FIG. 17. The detachment judging circuit 35c has: an input resistor 81; a P-channel FET (Field-Effect Transistor) 82; an N-channel FET 83; an input buffer circuit 84; an output buffer circuit 85; the input potential determining circuit 86; the high impedance judging circuit 87; the input/output control circuit 88; and the switch 89.

The resistor 81 is an input/output resistor for protecting the internal circuits such as the detachment judging circuit 35c from static electricity which has jumped from the outside or the like when the tag B has been detached along the split line 37. However, the provision of the resistor 81 can also be omitted in the case where circuits (e.g., the P-channel FET 82, the N-channel FET 83, and the input buffer 84) in stages subsequent to the resistor 81 have sufficient resistance to noise such as static electricity or the like. In the state prior to the detachment of the tag B, the resistor 81 is connected to the memory portion B32 (FIG. 16) through an input terminal IN1. The resistor 81 also has one terminal (opposite to the IN1) connected to each of the drain terminal of the P-channel FET 82, the drain terminal of the N-channel FET 83, the input terminal of the input buffer 84, and the output terminal of the output buffer 85.

The P-channel FET 82 and the N-channel FET 83 are field-effect transistors provided to set a bias voltage at a node P1 to which the respective drain terminals thereof are connected commonly. As each of the P-channel FET 82 and the N-channel FET 83, a MOS (Metal Oxide Semiconductor) field-effect transistor or a junction field-effect transistor, e.g., can be used. The P-channel FET 82 has the source terminal thereof connected to the power source VC, the gate terminal thereof connected to a voltage control terminal V1, and the drain terminal thereof connected to each of the node P1 and the input potential determining circuit 86. The N-channel FET 83 has the source terminal thereof connected to the GND (grounding), the gate terminal thereof connected to a voltage control terminal V2, and the drain terminal thereof connected to each of the node P1 and the input potential determining circuit 86.

If the voltage at the voltage control terminal V1 is not less than a gate cut-off voltage Vc1 (e.g., the power supply voltage VC) for the P-channel FET 82 and the voltage at the voltage control terminal V2 is not less than a gate cut-off voltage Vc2 (e.g., the power supply voltage VC) for the N-channel FET 83, only the N-channel FET 83 is brought into the ON state so that the potential at the node P1 becomes substantially equal to the ground (GND) potential. If the voltage at the voltage control terminal V1 is not more than the gate cut-off voltage Vc1 (e.g., connected to the GND) for the P-channel FET 82 and the voltage at the voltage control terminal V2 is not more than the gate cut-off voltage Vc2 (e.g., connected to the GND) for the N-channel FET 83, only the P-channel FET 82 is brought into the ON state so that the potential at the node P1 becomes substantially equal to the power supply voltage VC.

The voltage control terminals V1 and V2 are terminals for controlling the respective gate voltages of the P-channel FET 82 and the N-channel FET 83, which are controlled by the input/output control circuit 88. If the voltage at the voltage control terminal V1 is not less than the gate cut-off voltage Vc1 (e.g., the power supply voltage VC) for the P-channel FET 82 and the voltage at the voltage control terminal V2 is not more than the gate cut-off voltage Vc2 (e.g., connected to the GND) for the N-channel FET 83, each of the P-channel FET 82 and the N-channel FET 83 is brought into the OFF state so that the potential at the node P1 becomes substantially equal to the potential at the input terminal IN1. By thus controlling the voltages at the voltage control terminals V1 and V2, it becomes possible to selectively fix the potential at the node P1 or cause the potential at the node P1 to depend on an input/output signal.

The input potential determining circuit 86 is a circuit connected to each of the node P1 and the high impedance judging circuit 87 to determine the potential (e.g., the ground, VC, ½ VC, or the like) at the node P1. The high impedance judging circuit 87 is a circuit connected to each of the input potential determining circuit 86 and the memory region control circuit 35b to judge whether or not the node P1 is in the high impedance state. The input/output control circuit 88 controls the voltages at the V1 and V2, judges whether or not a data inputting/outputting operation should be performed with the tag B based on the result of the judgment of the high impedance state by the high impedance judging circuit 87, and controls the ON/OFF state of the switch 89. The switch 89 is a switch for controlling whether or not the writing/reading of data in and from the memory portion B32 (FIG. 16) of the tag B should be enabled. The input buffer 84 is a buffer for a data signal read from the memory portion B32, which is connected to each of the switch 89 and the node P1. The output buffer 85 is a buffer for a data signal to be written in the memory portion B32, which is connected to each of the switch 89 and the node P1. It is also possible to replace the P-channel FET 82 with a PNP bipolar transistor and replace the N-channel FET 83 with an NPN bipolar transistor. In this case, for the sake of precaution, the power supply voltage VC may be increased (to, e.g., 3 V) appropriately by a value (1.4 V) corresponding to a voltage drop between the base and the emitter.

A description will be given next to a method for judging the detachment of a part of the tag. The description will be given herein below to a method for judging whether or not a part of the tag has been detached. As a method for judging the detachment of a part of the tag, there is one which measures an amount of power supplied from the power supply circuit 34f. By providing the control portion 35 with power measuring means (corresponding to the data processing circuit 35a in the example shown in FIG. 16) for measuring an amount of power supplied from the power supply circuit 34f and making comparisons among an amount P1 of power supply in the state where the tag has undergone no detachment, an amount P2 of power supply in the state where the tag A has been detached, an amount P3 of power supply in the state where the tags A and B have been detached, and a current amount P4 of power supply, it becomes possible to judge the present state of detachment.

In the case where the power measuring means has the function of stopping the power supply to the memory portions A31 and B32 by using a control signal, the power measuring means stops the power supply to the memory portion A31 or to each of the memory portions A31 and B32 first (e.g., during the manufacturing of the tag), measures the amount of power supply, and then stores measurement data in a register provided in the control portion 35. In the case where the power measuring means does not have the function of stopping the power supply to the memory portions A31 and B32 by using a control signal, it is sufficient to deliberately detach a part of the tag in advance during the manufacturing thereof, deliberately measure the amount of power supply in each of the states, and then store measurement data in the register of the control portion 35 by using an external reader/writer device not shown.

Then, the power measuring measures the current amount P4 of power supply and compares the measured amount P4 with each of the amounts of power supply stored in the register so that the state of detachment of the tag is judged. It can be judged that the tag has undergone no detachment if P4 is nearly equal to P1, that the tag A has been detached if P4 is nearly equal to P3, and that each of the tags A and B has been detached if P4 is nearly equal to P2. An actual criterion for judgment is such that the tag is judged to have undergone no detachment if P1+A<P4<P1−A (A is an amount of margin for variations in power supply from one tag to another). The criteria for judging the states where the tag A has been detached and where each of the tags A and B has been detached are also the same.

As another method for judging the state of detachment of the tag, there is one which makes an judgment based on whether or not the data processing circuit 35a can perform the reading and writing of data with respect to the memory portion A31 or B32. This allows the judgment of the state of detachment of the tag based on whether or not the data processing circuit 35a can control the reading or writing of data from or in the memory portion A31 or B32. As still another method for judging the state of detachment of the tag, there is one which directly senses the state of detachment of the tag. This is a method for judging the state of detachment of the tag based on whether or not a data signal line connected to the tags A and B has been disconnected. When the tag A or B has been detached, the data signal line connected to the detached tag becomes open (i.e., in the high impedance state). Accordingly, it becomes possible to judge the state of detachment of the tag by sensing whether or not the data signal line is in the high impedance state. Instead of sensing the high impedance state by using the data signal line, it is also possible to sense a high impedance state on the ground line or the power line.

Figure 18:
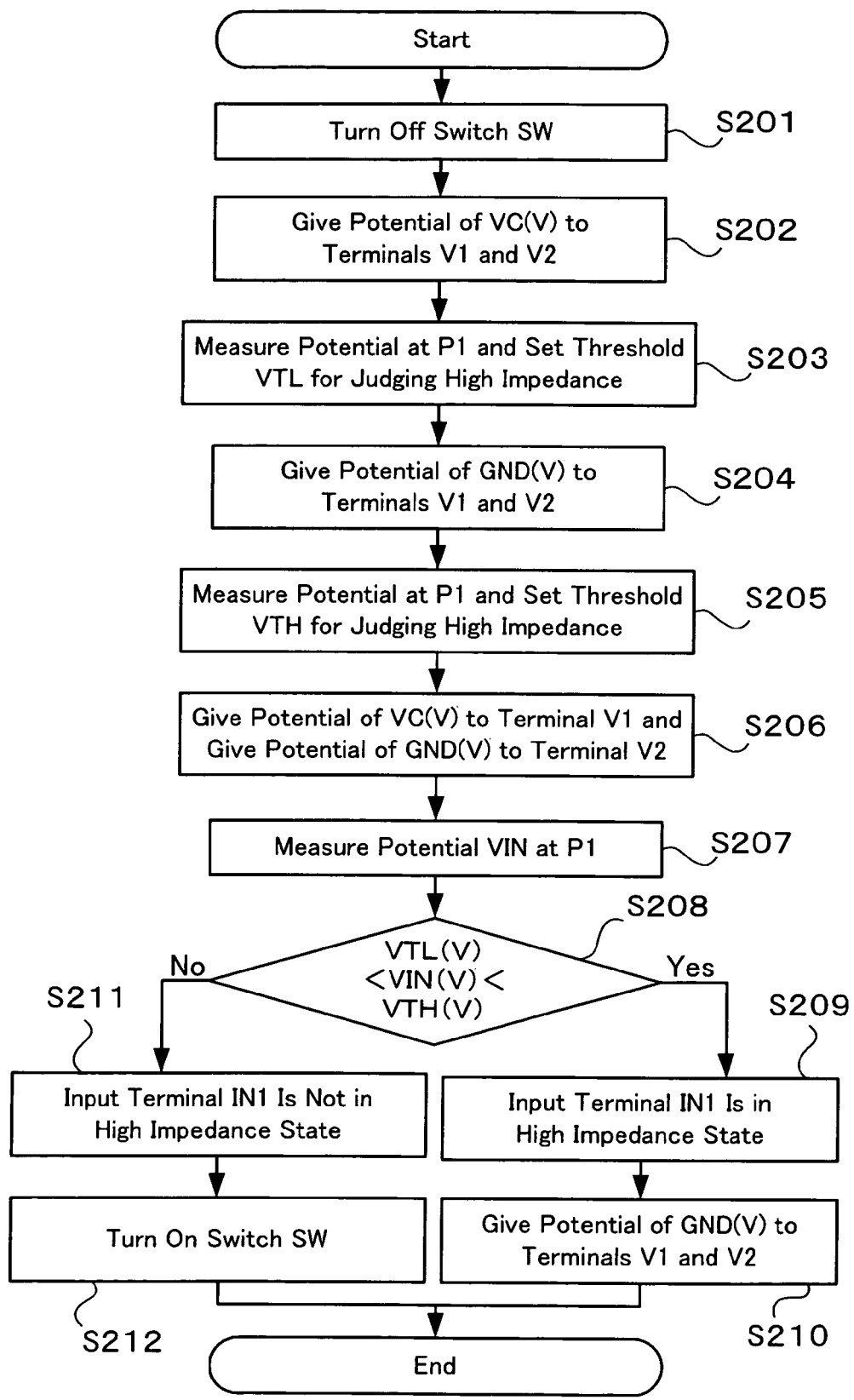
FIG. 18 is a flow chart showing an example of a method for judging the detachment of a part of a tag according to the present invention.
Figure 19:
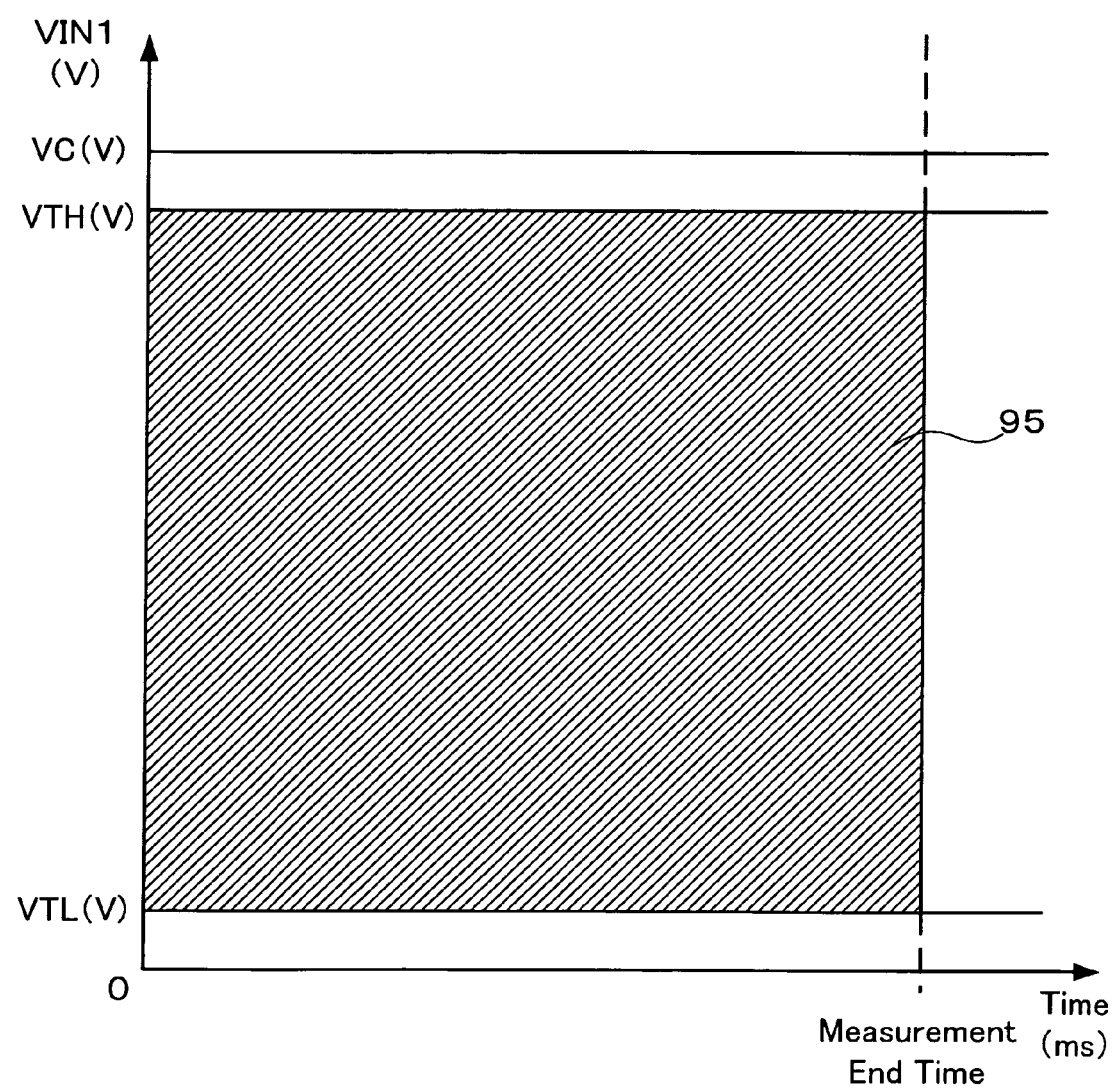
FIG. 19 shows an example of a specific criterion for judging a high impedance state in the method for judging the detachment of a part of the tag according to the present invention.

A description will be given next to a detailed example of the method for judging the detachment of the tag. FIG. 18 is a flow chart diagram showing the flow of a process for judging the state of detachment of the tag. FIG. 19 shows an example of the principle of the judgment. A detailed description will be given herein below to a method for sensing the state of detachment of a part of the tag by utilizing the high impedance state on the data signal line with reference to FIGS. 16, 17, and 19 if necessary, but mainly in accordance with FIG. 18. FIG. 18 is a flow chart showing an example of the method for judging the detachment of a part of the tag according to an embodiment of the present invention. FIG. 19 shows an example of a specific criterion for judging the high impedance state in the method for judging the detachment of a part of the tag according to the present embodiment. In Step S201 at the stage where the tag 1 is about to start the communication with an external reader/writer device not shown by using a radio signal, the input/output control circuit 88 of the control portion 35 brings the switch SW89 into the OFF state. This is a process performed to protect, when a part of the tag has already been detached, the internal circuits (e.g., the control portion 35) of the tag from, e.g., an excessively large noise signal resulting from static electricity or the like from the data signal line.

Next, in Step S202, the input/output control circuit 88 gives the power source potential VC (e.g., 1.5 V) to each of the terminals VI and V2. This is a process performed to bring only the N-channel FET 83 into the ON state and fix the potential at the node P1 to the ground potential (e.g., 0 V). Next, in Step S203, the input potential determining circuit 86 measures the potential at the node P1 and sets a threshold VTL (e.g., 0.1 V) for judging the high impedance state shown in FIG. 19 based on the result of the measurement. The threshold VTL is preferably set to be higher than a value actually measured at the node P1 in consideration of the influence of a measurement error, variations in the characteristics of circuit elements, and the like. Next, in Step S204, the output control circuit 88 gives a ground (e.g., 0 V) potential to each of the terminals V1 and V2. This is a process performed to bring only the P-channel FET 82 into the ON state and fix the potential at the node P1 to the power source potential (e.g., 1.5 V). Next, in Step S205, the input potential determining circuit 86 measures the potential at the node P1 and sets a threshold VTH (e.g., 1.4 V) for judging the high impedance state shown in FIG. 19 based on the result of the measurement. The threshold VTH is preferably set to be lower than a value actually measured at the node P1 in consideration of the influence of a measurement error and variations in the characteristics of the circuit elements.

Next, in Step S206, the output control circuit 88 gives the power source potential VC (e.g., 1.5 V) to the terminal V1 and gives the ground potential (e.g., 0 V) to the terminal V2. This is a process performed to bring each of the P-channel FET 82 and the N-channel FET 83 into the OFF state and adjust the potential at the node P1 exactly to the potential of the data signal. Next, in Step S207, the input potential determining circuit 86 measures the potential at the node P1 and transmits the result of the measurement to the high impedance judging circuit 87. Next, in Step S208, the high impedance judging circuit 87 judges whether or not Threshold VTL<Measurement Result VIN<Threshold VTH (Expression 1) is satisfied for a specified period (e.g., 100 milliseconds). A description will be given to the significance of (Expression 1) for judgment. When the data signal line is connected to the memory portion B32, the potential at the node P1 is normally biased to the ground potential or the potential of the power supply voltage even in the absence of an input signal. During the passage of a data signal also, the ground potential or the power source potential is held inevitably for a specified period (depending on the frequency of an operational clock) in spite of the presence of a transient state. This allows the judgment that the node P1 is not in the high impedance state when the ground potential or the power source potential is shown for a specified period.

On the other hand, when the input terminal IN1 has been opened to be in the high impedance state, the input impedance is not constant and the potential at the node P1 may occasionally vary with time so that it is barely fixed to the ground potential or the power source potential for a specified period. Therefore, when a state in which the potential at the node P1 is between the ground potential and the power potential continues for a specified period without showing the ground potential or the power source potential for a specified period, it can be judged that the node P1 is in the high impedance state. If the condition in (Expression 1) shown above is satisfied for a specified period, the whole process flow advances to Step S209 where it is judged that the node P1 (i.e., the input terminal IN1) is in the high impedance state, and consequently, that a part (corresponding to the tag B in the example shown in FIG. 16) of the tag has been detached. Next, in Step S210, the input/output control circuit 88 gives a ground potential (e.g., 0 V) to each of the terminals V1 and V2. This brings only the N-channel 83 into the OFF state, fixes the potential at the node P1 to the power source potential (e.g., VC volt), and prevents unneeded noise from the outside from entering the internal circuits. Since the tag B has already been detached, the node P1 retains the present potential state (VC) till the end of communication and ends the process.

If the condition in (Expression 1) shown above has not been satisfied for a specified period, the whole process flow advances to Step S211 where it is judged that the node P1 (i.e., the input terminal IN1) is not in the high impedance state, and consequently, that a part (which is the tag B in the example of FIG. 16) of the tag remains attached. Next, in Step S212, the input/output control circuit 88 brings the switch 89 into the ON state and thereby enables the writing/reading of the data signal between the data processing circuit 35a and the memory portion B32 of the tag B. Since the tag B has not been detached yet, the node P1 retains the present potential state (the potential of the passing data signal) till the end of communication and ends the process.

Although the description has been given heretofore in accordance with the present embodiment, it will easily be appreciated that the present invention is not limited to these examples and various modifications can be made. For example, although the description has been given to the case where a read/write operation to the tag shown in the example of the present embodiment is performed by using a radio signal, it would be obvious to a person skilled in the art that a wire-line read/write operation can also be performed thereto. Alternatively, the transmission and reception according to the present invention can also be implemented by using not only an electric wave but also light such as infrared light. The tag may also be formed integrally with a package or a container and the mounting mode thereof is by no means limited. The detachment of the tag may also be performed by using a method which prevents the target portion of detachment from functioning by an electrical or optical method or the like instead of the method which performs physical detachment. It is also possible to reuse the tag that has been prevented from functioning by such a method. The present invention is also applicable to a slip management system related to the provision of service.

INDUSTRIAL APPLICABILITY

In accordance with the present invention, a tag having detachable portions allows an access to only a specified memory region therein when all the detachable portions are present. However, the memory region cannot be accessed any more when a part of the tag has been detached, while an access to another memory region is enabled. Since the function of the tag can thus be changed in accordance with the physical condition of the tag, it becomes extremely difficult to reference or falsify data in the tag afterward. As a result, a tag having a reliable security function can be provided. It also becomes possible to perform quality assurance by inputting data such as a production date and a sell-by date to the tag, attaching the tag to a food product or the like, and shipping the product.

The invention claimed is:

1. A tag comprising at least one detachable portion A, having a first function in a state where said portion A remains attached, and shifting to a second function different from said first function when said portion A is detached, wherein
   a tag portion B other than said detachable portion A comprises a first memory portion for storing data,
   said first function includes a function of writing data in a first memory region provided in said first memory portion, and
   said second function includes a function of writing data in a second memory region other than said first memory region.

2. A tag according to claim 1, wherein
   said portion A comprises a second memory portion, and
   said second memory portion has a specification data memory region for storing specification data for specifying a given memory region provided in said first memory portion.

3. A tag according to claim 2, wherein said memory region is specified based on presence or absence of a sign stored in said specification data memory region or on a content thereof.

4. A tag according to claim 3, wherein said sign serves as a criterion for judging whether or not said portion A has been detached.

5. A tag according to claim 4, wherein said sign is composed of a combination of a tag ID for identifying an individual tag and a keyword for specifying the memory region in said first memory portion.

6. A method for managing merchandise distribution using a tag as recited in claim 1, said method comprising the steps of:
affixing or attaching said tag in an attached state to merchandise or an object belonging to the merchandise and writing first data related to a process of manufacturing said merchandise in said tag; and
detaching, at a stage of selling the merchandise, a part of the tag at a stage of manufacturing the merchandise and writing second data related to a process of selling said merchandise in a remaining portion of the tag after the detachment.

7. A method according to claim 6, wherein
said first data includes any of a tag ID for recognition of an individual tag, a maker code for recognition of a manufacturer's name, a manufacturing number for recognition of an individual item of merchandise, and a key code and
said second data includes either of a shop code for recognition of a seller's name and a purchase date for recognition of a sales date.

8. A system for managing merchandise distribution using a tag as recited in claim 1, said system comprising:
a first device used at a stage of manufacturing merchandise to affix or attach the tag in an attached state to merchandise or an object belonging to the merchandise and write first data related to a process of manufacturing said merchandise in said tag; and
a second device used at a stage of selling the merchandise to write second data related to a process of selling said merchandise in a remaining portion of the tag after a part of the tag at said stage of manufacturing said merchandise has been detached.

9. A system according to claim 8, further having a management device for associating said first and second devices with each other.

10. A method for managing a slip for service by using a tag as recited in claim 1, said method comprising the steps of:
affixing or attaching the tag to a slip related to service at a stage of receiving an order of the service or writing first data related to the service to be provided in the slip with the tag attached thereto; and
detaching, at a stage of providing the service, a part of the tag at said stage of receiving the order of the service and writing second data related to a step of providing the service in a remaining portion of the tag after the detachment.

11. A tag according to claim 1, wherein
said first function includes a function of performing at least writing of data with respect to a first memory portion for storing data which is provided in said detachable portion A and
said second function includes a function of performing at least the writing of data with respect to a second memory portion for storing data provided in said remaining portion B of the tag.

12. A method for managing merchandise distribution using a tag as recited in claim 1, said method comprising the steps of:
affixing or attaching, at a stage of manufacturing merchandise, the tag in an attached state to the merchandise or an object belonging to the merchandise, writing first data related to a process of manufacturing said merchandise in said tag, and then detaching one of the detachable portions of said tag to arbitrarily hold the detached portion; and
writing, at a stage of selling the merchandise, second data related to a process of selling said merchandise in the tag in a state at an end time of said stage of manufacturing the merchandise and further detaching a detachable part of tag from said tag to arbitrarily hold the detached tag.

13. A method according to claim 12, wherein
said first data includes data selected from the group consisting of a tag ID for recognition of an individual tag, a maker code for recognition of a manufacturer's name, and a manufacturing number for recognition of an individual item of merchandise and
said second data includes data selected from the group consisting of the tag ID for the recognition of the individual tag, a shop code for recognition of a seller's name, and a purchase date for recognition of a sales date.

14. A method according to claim 13, further comprising the step of:
searching for data written in the tag detached at said stage of manufacturing the merchandise and data written in the tag detached at said stage of selling the merchandise by using said tag ID as a key for comparison therebetween.

15. A tag comprising at least one physically detachable portion, wherein said detachable portion and a whole or part of a portion of the tag other than said detachable portion are mutually laminated in layers or wholes or parts of said detachable portions are mutually laminated in layers, or alternatively, wholes or parts of said portions laminated in layers are mutually laminated, wherein
said detachable portion and the portion of the tag other than said detachable portion have respective memory regions in which data can be written and stored or from which data can be read individually.

16. A substrate having an electronic component mounted thereon to control an operation of a tag comprising at least one detachable portion A, having a first function in a state in which said portion A remains attached, and shifting to a second function different from said first function when said portion A is detached, said substrate comprising:
at least one physically detachable portion, wherein said electronic component includes at least:
a first electronic circuit associated with an input/output interface portion which performs transmission and reception between itself and a reader/writer device for reading data from said tag or writing data in said tag;
a second electronic circuit associated with a control portion which performs a control operation for reading data from said tag or writing data in said tag; and
a third electronic circuit associated with a memory portion which stores therein said data, wherein
said third electronic circuit comprises a plurality of physically separated memory circuits, and
at least one of the plurality of memory circuits is mounted on said portion A, while at least one of the plurality of memory circuits is mounted on said portion B.

17. A tag having a single or plurality of physically detachable portions A, said tag comprising:

an input/output interface portion for performing transmission/reception and modulation/demodulation of a data signal;

a control portion for specifying a memory region in which data inputted from said input/output interface portion is to be written or a memory region from which data to be outputted to said input/output interface portion is read based on whether or not said portion A has been detached from a main body of the tag or on a position in the main body of the tag at which said detached portion A was located before detachment thereof; and a single or plurality of memory portions each having at least one memory region that has been specified, wherein at least one memory portion is present in said portion A or in each of said portions A, and at least one memory portion is present in a portion B of the tag other than said detachable portion or portions A.

18. A tag according to claim 17, wherein said control portion has a detachment judging circuit for judging whether or not said portion A has been detached or the position in the main body of the tag at which said detached portion A was located before the detachment thereof.

19. A tag according to claim 18, wherein said detachment judging circuit judges whether or not said portion A has been detached by sensing whether or not any of a data signal line connected to the memory portion present in said portion A, a ground line, and a power line is in a high impedance state.

20. A tag according to claim 19, wherein, when a potential at a point (P1) at which the data signal line connected to the memory portion present in said portion A is substantially connected to the detachment judging circuit has shown a middle value between a potential approximate to a power source potential (VC) and a potential approximate to a ground (GND) potential for a specified period, said detachment judging circuit senses that said data signal line is in the high impedance state and judges that said portion A has been detached.

21. An RFID tag comprising:

at least a first detachable portion detachable from a remainder of the tag; and a second detachable portion detachable from a remainder of the tag after detachment of the first detachable portion, wherein the tag has a first function in a state where said detachable first portion remains attached to the tag, said tag shifting to a second function different from said first function when said detachable first portion is detached from the remainder of the tag, and the tag shifts from said second function to a third function different from said first function and said second function when said detachable second portion is detached from the remainder of the tag.

22. The RFID tag according to claim 21, further comprising a first memory portion comprising at least a first memory region, a second memory region, and a third memory region, wherein said first function includes writing data in the first memory region, said second function includes writing data in said second memory region, and said third function includes writing data in said third memory region.

* * * * *